US 12,530,194 B2

(12) United States Patent
Wang

(10) Patent No.: US 12,530,194 B2
(45) Date of Patent: Jan. 20, 2026

(54) VECTOR SHIFT METHOD, PROCESSOR, AND ELECTRONIC DEVICE

(71) Applicant: LOONGSON TECHNOLOGY CORPORATION LIMITED, Beijing (CN)

(72) Inventor: Wenxiang Wang, Beijing (CN)

(73) Assignee: LOONGSON TECHNOLOGY CORPORATION LIMITED, Beijing (CN)

( * ) Notice: Subject to any disclaimer, the term of this patent is extended or adjusted under 35 U.S.C. 154(b) by 0 days.

(21) Appl. No.: 18/717,995

(22) PCT Filed: Dec. 8, 2022

(86) PCT No.: PCT/CN2022/137506
§ 371 (c)(1),
(2) Date: Jun. 7, 2024

(87) PCT Pub. No.: WO2023/104145
PCT Pub. Date: Jun. 15, 2023

(65) Prior Publication Data
US 2025/0103330 A1    Mar. 27, 2025

(30) Foreign Application Priority Data

Dec. 10, 2021 (CN) .......................... 202111509173.2

(51) Int. Cl.
   *G06F 9/30*    (2018.01)
(52) U.S. Cl.
   CPC ...... *G06F 9/30032* (2013.01); *G06F 9/30036* (2013.01)
(58) Field of Classification Search
   CPC .......................... G06F 9/30032; G06F 9/30036
See application file for complete search history.

(56) References Cited

U.S. PATENT DOCUMENTS

| | | | |
|---|---|---|---|
| 6,088,782 A | 7/2000 | Lee et al. | |
| 6,438,676 B1 * | 8/2002 | Sijstermans | ........ G06F 9/30032 |
| | | | 712/E9.034 |

(Continued)

FOREIGN PATENT DOCUMENTS

| | | |
|---|---|---|
| CN | 104011673 A | 8/2014 |
| CN | 107851019 A | 3/2018 |

(Continued)

OTHER PUBLICATIONS

Notice of Allowance for Patent Registration from Korean Intellectual Property Office dated Sep. 5, 2024 for Application No. 10-2024-7021515.

(Continued)

*Primary Examiner* — Cheng Yuan Tseng

(57) ABSTRACT

A vector shift method includes: receiving an instruction including a register identifier and a shift parameter, where the register identifier includes a source register identifier representing a source register to store a source element to be operated in a vector shift operation, and a destination register identifier representing a destination register to store a target element obtained from the vector shift operation, and the shift parameter is used to indicate a rule for the vector shift operation performed on the source element; executing the instruction to perform, according to the shift parameter, the vector shift operation on the source element acquired from the source register, and acquire the target element produced from the vector shift operation; and writing the target element into the destination register.

17 Claims, 5 Drawing Sheets

(56) References Cited

U.S. PATENT DOCUMENTS

| | | | |
|---|---|---|---|
| 6,546,480 B1 | 4/2003 | Mandavilli et al. | |
| 8,156,284 B2 * | 4/2012 | Vorbach | G06F 9/30181 |
| | | | 711/159 |
| 8,914,590 B2 * | 12/2014 | Vorbach | G06F 12/0862 |
| | | | 711/143 |
| 9,170,812 B2 * | 10/2015 | Vorbach | G06F 12/0875 |
| 10,048,966 B2 | 8/2018 | Thantry et al. | |
| 11,003,447 B2 * | 5/2021 | Stephens | G06F 9/30014 |
| 2004/0098556 A1 | 5/2004 | Buxton et al. | |
| 2017/0060586 A1 * | 3/2017 | Lingam | G06F 9/30036 |
| 2018/0210733 A1 | 7/2018 | Stephens et al. | |
| 2019/0102176 A1 | 4/2019 | Madduri et al. | |
| 2019/0102192 A1 | 4/2019 | Madduri et al. | |
| 2020/0174788 A1 | 6/2020 | Madduri et al. | |
| 2021/0182077 A1 * | 6/2021 | Chen | G06Q 30/0241 |
| 2023/0229730 A1 * | 7/2023 | Mansell | G06F 9/30032 |
| | | | 708/209 |

FOREIGN PATENT DOCUMENTS

| | | | |
|---|---|---|---|
| CN | 107992329 A | 5/2018 | |
| CN | 109947697 A | 6/2019 | |
| CN | 110221807 A | 9/2019 | |
| CN | 111813447 A | 10/2020 | |
| CN | 114296798 A | 4/2022 | |
| JP | 2005174297 A | 6/2005 | |
| KR | 20120099236 A | 9/2012 | |
| KR | 20190082079 A | 7/2019 | |

OTHER PUBLICATIONS

International Search Report dated Feb. 22, 2023 for International Application No. PCT/CN2022/137506.
The First Office Action dated Mar. 25, 2024 from The State Intellectual Property Office of People's Republic of China regarding Application No. 2021115091732.
Notification to Grant Patent Right for Invention dated Jun. 14, 2024 for Chinese Application No. 202111509173.2.
Notice of Reasons for Refusal dated Jan. 7, 2025 for Japanese Patent Application No. 2024-534617.
Extended European Search Report dated Feb. 25, 2025 for Application No. 22903564.7.
Communication pursuant to Article 94(3) EPC for European Patent Application No. 22 903 564.7, dated Nov. 3, 2025.

* cited by examiner

VECTOR SHIFT METHOD, PROCESSOR, AND ELECTRONIC DEVICE

CROSS-REFERENCE TO RELATED APPLICATIONS

This application is a National Stage of International Application No. PCT/CN2022/137506, filed on Dec. 8, 2022, which claims priority to Chinese Patent Application No. 202111509173.2, filed with China National Intellectual Property Administration on Dec. 10, 2021 and entitled "VECTOR SHIFT METHOD, PROCESSOR, AND ELECTRONIC DEVICE". The disclosures of the above patent applications are incorporated herein by reference in their entireties.

TECHNICAL FIELD

The present application relates to the field of computer technologies and, in particular, to a vector shift method, a processor and an electronic device.

BACKGROUND

With the development of multimedia applications, more and more computing tasks of processors come from the field of digital image processing. An image-based application becomes a non-negligible workload in a server, a desktop computer and a personal mobile device (that is, an embedded device). Upgrade to an instruction system architecture in respect of an actual situation of digital image processing software to provide instruction support for operations commonly used in the application in a processor has become a main direction for processor development, and meanwhile is a simple and effective method to improve processor performance with regard to a specific application. Therefore, a Single Instruction Multiple Data (SIMD) structure is added to more and more processors to support a same operation on a regular data set.

At present, shift instructions are commonly introduced into SIMD processors, and different shift instructions can satisfy different requirements. However, in prior art solutions, to fulfill some specific vector shift purpose, a plurality of instructions may be required to implement a series of operations. This is operation complex and execution inefficient for such specific purpose.

SUMMARY

The present application provides a vector shift method, a processor and an electronic device, to solve the problem in the prior art that a plurality of instructions are required to implement a vector shift operation resulting in a problem of operation complex and execution inefficient for the specific purpose.

In order to address the aforementioned problem, the present application provides a vector shift method. The method includes:

receiving an instruction including a register identifier and a shift parameter, where the register identifier includes a source register identifier representing a source register to store a source element to be operated in a vector shift operation, and a destination register identifier representing a destination register to store a target element obtained from the vector shift operation, and the shift parameter is used to indicate a rule for the vector shift operation performed on the source element; executing the instruction to perform, according to the shift parameter, the vector shift operation on the source element acquired from the source register, and acquire the target element produced from the vector shift operation; and writing the target element into the destination register.

In order to address the aforementioned problem, the present application provides a processor, including:

a plurality of vector registers including a source register and a destination register, where the source register is configured to store a source element to be operated in a vector shift operation;

an instruction decoding unit configured to decode a vector shift instruction, where the vector shift instruction includes a register identifier and a shift parameter, the register identifier includes a source register identifier representing the source register and a destination register identifier representing the destination register; and a performing unit configured to perform, in response to the vector shift instruction and according to the shift parameter, the vector shift operation on the source element acquired from the source register, and acquire a target element produced from the vector shift operation, and write the target element into the destination register.

In order to address the aforementioned problem, the present application provides an electronic device including: a memory; and one or more programs, where the one or more programs are stored in the memory, and are configured to be executed by one or more processors to perform the vector shift method described above in one or more items.

Compared with the prior art, the present application involves the following advantages:

according to the vector shift method, the processor and the electronic device provided in the embodiments of the present application, a register identifier and a shift parameter are added to a vector shift instruction, where the register identifier is used to indicate a register to store a source element to be operated in a vector shift operation and a register to store a target element obtained from the vector shift operation, and the shift parameter is used to indicate a rule for the vector shift operation performed on the source element; therefore, it is possible to achieve a specific vector shift purpose with use of only one instruction, and there is no need to achieve the specific vector shift purpose with use of a plurality of instructions. Thus, the operation is simple, and the execution efficiency of the specific purpose is improved.

DESCRIPTION OF EMBODIMENTS

Figure 1:
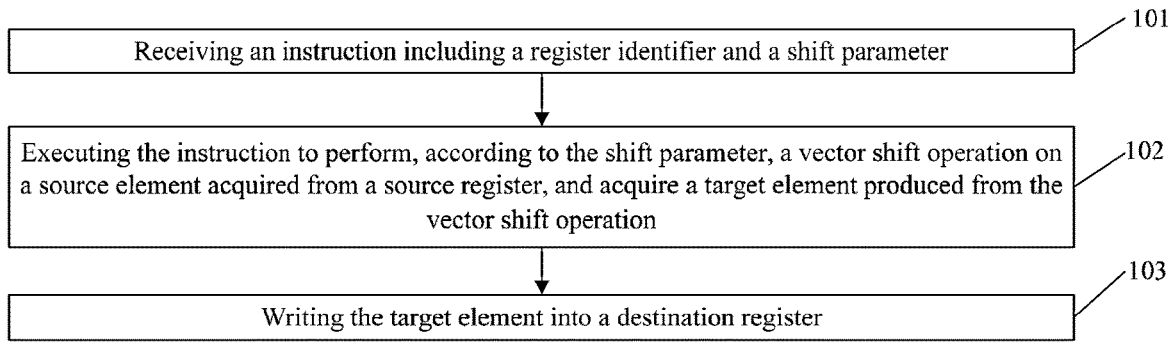
FIG. 1 is a flowchart illustrating steps of a vector shift method according to Embodiment I of the present application.

In order to make the aforementioned objectives, characteristics and advantages of the present application more evident and comprehensible, the present application will be described hereunder in further details in conjunction with the accompanying drawings and the specific implementations.

It should be understood that the terms such as "first", "second", "third" and the like in the specification and the claims as well as the above-mentioned accompany drawings of the present application are used to distinguish similar objects, but not intended to describe a specific order or sequence. It will be appreciated that the data used in this way can be exchangeable under appropriate circumstances, and for example, can be implemented in an order other than those illustrated or described in the embodiments of the present application.

Although the following embodiments are described with reference to a processor, other embodiments are applicable to other types of integrated circuits and logic devices. The aforementioned technologies and teachings of the present application can be more readily applied to other types of circuits or semiconductor devices, which will benefit from higher pipeline throughput and improved performance. The embodiments of the present application are applicable to any processor or machinery performing data manipulation. However, the present application is not limited to a processor or machinery performing 256-bit, 128-bit, 64-bit, 32-bit, or 16-bit data operations, but is applicable to any processor and machinery in which combined data needs to be operated.

In the following description, for the sake of explanation, a large number of specific details are given to provide a thorough understanding of the present application. However, those skilled in the art should recognize that these specific details are not necessary to implement the present application. In other circumstances, some well-known electrical structures and circuits are not provided in detail to avoid unnecessary confusion with the present application. In addition, the following description provides a plurality of examples, and the accompanying drawings illustrate various examples for illustration. However, these examples should not be interpreted as restrictive, since they are only intended to provide some examples of the present application, rather than exhaustion of all possible implementations of the present application.

Although instruction processing and distribution in the context of a performing unit are described in the following examples, other embodiments of the present application may be implemented in a form of software. In an embodiment, the method according to the present application takes the form of machine executable instructions. The instructions may be used to enable a general-purpose or special-purpose processor programmed with these instructions to perform the steps of the present application. The present application may be provided as a computer program product or software; the product or the software may include a machine-readable medium or a computer-readable medium which has stored thereon an instruction configured for programing a computer (or other electronic device) to execute the processor according to the present application. Or, the steps of the present application may be performed by a dedicated hardware component containing hard wired logic for performing the steps, or by any combination of a programmed computer component and a customized hardware component. Such software may be stored in a memory within a system.

For the vector shift method provided in the present embodiment, the execution subject thereof can be a Central Processing Unit (CPU).

Embodiment I

Reference is made to FIG. 1, which shows a flowchart illustrating steps of a vector shift method according to Embodiment I of the present application. The vector shift process includes the following steps.

Step 101: receiving an instruction including a register identifier and a shift parameter.

In the embodiment of the present application, the instruction is an instruction for performing a vector shift operation, and the instruction is an instruction for execution by a processor; the instruction includes a register identifier and a shift parameter. The register identifier includes a source register identifier representing a source register to store a source element to be operated in a vector shift operation, and a destination register identifier representing a destination register to store a target element obtained from the vector shift operation, and the shift parameter is used to indicate a rule for the vector shift operation performed on the source element.

In an implementation, there can be one or two source registers in number, that is, the source element comes from one or two registers. Specifically, the number of source registers can be set based on service requirements, which is not limited in the embodiment of the present application.

In an implementation, the received instruction is decoded to acquire the shift parameter contained in the instruction; the shift parameter is used to indicate a rule for the vector shift operation performed on the source element. In this example, the shift parameter may include parameters such as a shift amount and an opcode. In an implementation, the opcode is code represented in a binary manner, or an identifier convertible into binary code.

After the instruction is decoded, proceed with execution of step 102.

Step 102: executing the instruction to perform, according to the shift parameter, a vector shift operation on a source element acquired from a source register, and acquire a target element produced from the vector shift operation.

In the embodiment of the present application, after the CPU receives the instruction for performing the vector shift operation, the instruction may be executed by the CPU to perform, according to the shift parameter, the vector shift operation on the source element acquired from the source register, and acquire the target element produced from the vector shift operation.

After the target element produced from the vector shift operation is acquired, proceed with execution of step 103.

Step 103: writing the target element into a destination register.

In the embodiment of the present application, after acquiring the target element produced from the vector shift operation, the target element can be written into the destination register.

In an implementation, the shift amount and the shift operation rule can be determined according to the shift parameter, and the vector shift operation can be performed according to the shift amount and the shift operation rule. Specifically, detailed description can be made in conjunction with the following specific implementations.

Figure 2:
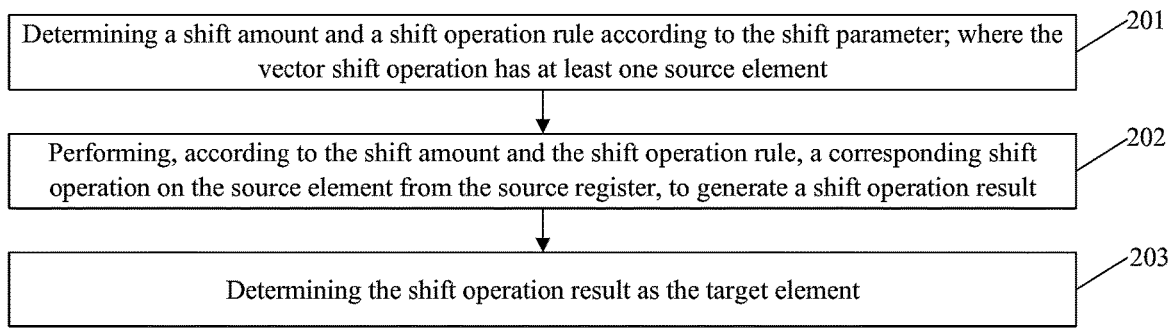
FIG. 2 is a flowchart illustrating steps of a method for acquiring a target element according to an embodiment of the present application.

Reference is made to FIG. 2, which shows a flowchart illustrating steps of a method for acquiring a target element according to an embodiment of the present application. The process for acquiring the target element includes the following steps.

Step 201: determining a shift amount and a shift operation rule according to the shift parameter; where the vector shift operation has at least one source element.

In the embodiment of the present application, there may be one or more source registers in number, and there may be one destination register in number. The source register identifier is the same as or different from the destination register identifier; the source element has any one of the following data types: half-word, word, double-word and quad-word. The shift amount can be used to indicate the number of bits by which the source element is to be shifted in the vector shift operation; the shift amount stems from an immediate or a shift amount register, where the immediate is a parameter, in the shift parameter, defined by the opcode, and the value of the immediate can refer to the data type of the source element, and the data type is defined by the above-described opcode. The shift amount register is a register for storing the shift amount; when the shift amount stems from the shift amount register, the shift amount is a set of data. For example, the shift amount can contain different bits to express shifting for different source elements. The shift operation rule refers to one or more operations to be performed on the source element.

After the shift amount and the shift operation rule are determined according to the shift parameter, proceed with execution of step 202.

Step 202: performing, according to the shift amount and the shift operation rule, a corresponding shift operation on the source element from the source register, to generate a shift operation result.

In the embodiment of the present application, the shift operation rule refers to a method and/or a constraint condition for performing a shift operation on an element within the source register.

After the shift operation result is generated by performing, according to the shift amount and the shift operation rule, the corresponding shift operation on the source element from the source register, proceed with execution of step 203.

Step 203: determining the shift operation result as the target element.

In the embodiment of the present application, the opcode may be included in the shift parameter, and the opcode can be used to indicate selection of the source element from the source register and a storage mode of the target element into the destination register. The specific vector shift operation process can be described in detail in conjunction with the following implementations.

Figure 3:
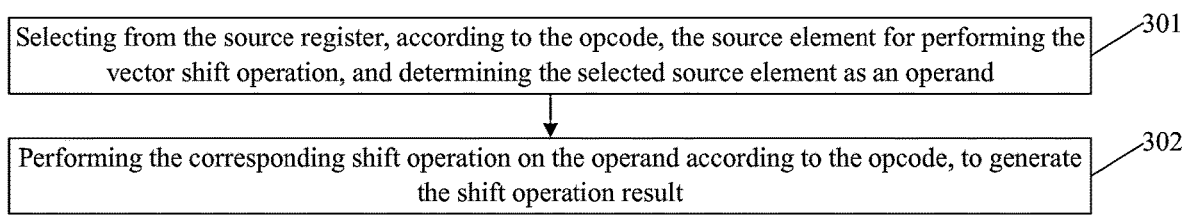
FIG. 3 is a flowchart illustrating steps of a method for acquiring a shift operation result according to an embodiment of the present application.

Reference is made to FIG. 3, which shows a flowchart illustrating steps of a method for generating a shift operation result according to an embodiment of the present application. The process for generating the shift operation result includes the following steps.

Step 301: selecting from the source register, according to the opcode, the source element for performing the vector shift operation, and determining the selected source element as an operand.

In the embodiment of the present application, the shift parameter may include a shift amount and an opcode. The shift amount can be used to indicate the number of bits by which the source element is to be shifted in the vector shift operation. The opcode can be used to represent a shift operation rule for the source element from the source register and the target element from the destination register.

In an implementation, the instruction is formatted as "opcode destination register, source register, shift amount". Exemplarily, the instruction can be represented as "[X] VSSR. {B.H/H.W/W.D/D.Q/BU.H/HU.W/WU.D/DU.Q} vd/xd, vj/xj, ui", where [X]VSSR represents the name of the instruction in the opcode, with [X] being optional, determined based on the type of the register; in {B.H/H.W/W.D/D.Q/BU.H/HU.W/WU.D/DU.Q}, a part before "." represents the data type of the target element in the opcode, and a part after "." represents the data type of the source element in the opcode, B representing byte, H representing half-word, W representing word, D representing double-word, Q representing quad-word, and U representing unsigned; vd/xd represents the destination register, and vj/xj represents the source register, meanwhile vd/xd may also represent the source register simultaneously, vj and vd are registers with the same number of bits, and xj and xd are registers with the same number of bits; ui represents the immediate, which is the shift amount. Exemplarily, the instruction may also be represented as "[X]VSSR. {B.H/H.W/W.D/D.Q/BU.H/HU.W/WU.D/DU.Q} vd/xd, vj/xj, vk/xk", where [X]VSSR, {B.H/H.W/W.D/D.Q/BU.H/HU.W/WU.D/DU.Q}, vd/xd and vj/xj represent the same meanings as those in the preceding example, and vk/xk represents the shift amount register.

After the source element for performing the vector shift operation is selected from the source register according to the opcode and the selected source element is determined as the operand, proceed with execution of step 302.

Step 302: performing the corresponding shift operation on the operand according to the opcode, to generate the shift operation result.

In the embodiment of the present application, after the operand is determined, the corresponding shift operation can be performed on the operand according to the opcode, to generate the shift operation result, and the element contained in the shift operation result is the target element.

After the shift operation result is generated, proceed with execution of step 401.

Figure 4:
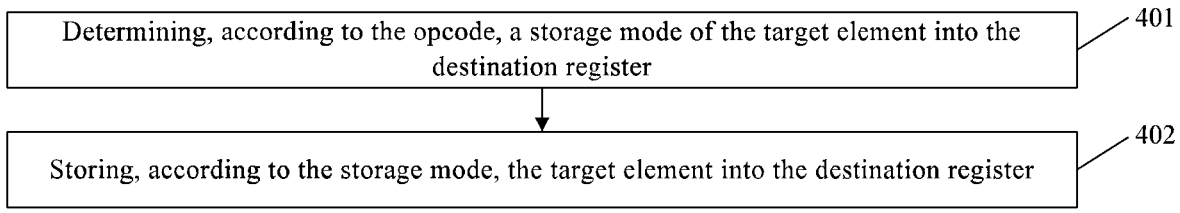
FIG. 4 is a flowchart illustrating steps of a method for storing a target element according to an embodiment of the present application.

Reference is made to FIG. 4, which shows a flowchart illustrating steps of a method for storing a target element according to an embodiment of the present application. The process for storing the target element includes the following steps.

Step 401: determining, according to the opcode, a storage mode of the target element into the destination register.

In the embodiment of the present application, the storage mode refers to a rule for storing the target element into the destination register. In an implementation, the storage mode mainly represents a rule for storing the target element into a location of the destination register; exemplarily, the storage mode may include: storing higher half data of the target element into a higher half of a position of the target element in the destination register, or storing lower half data of the target element into a lower half of a position of the target element in the destination register, or storing range-specified data of the target element into a specified address range of a position of the target element in the destination register.

After the storage mode of the target element into the destination register is determined according to the opcode, proceed with execution of step 402.

Step 402: storing, according to the storage mode, the target element into the destination register.

In the embodiment of the present application, after the shift operation result is acquired, the shift operation result can be determined as the target element. After the storage mode of the target element into the destination register is determined according to the opcode, the target element can be stored into the destination register.

In the prior art, when in need to implement a vector shift operation, it is necessary to perform vector shift through a plurality of instructions based on a vector shift requirement which is determined based on a practical application. For example, if the vector shift requirement is right shift and truncation to half width for an operand in two vector registers, then at least two right shift instructions, two truncation instructions, and one saturate-to-half-width instruction are required to achieve the vector shift requirement. In the embodiment of the present application, an instruction containing a shift parameter is effectuated, and different shift parameters can achieve different shift requirements. Therefore, the use of a single shift instruction can achieve a variety of vector shift requirements, thereby effectively reducing the system overhead and improving the execution efficiency for the specific vector shift purpose.

Through Embodiment II to Embodiment IV, detailed descriptions will be made hereunder to an implementation process of a vector shift instruction under different opcodes and different shift amounts.

Embodiment II

Figure 5:
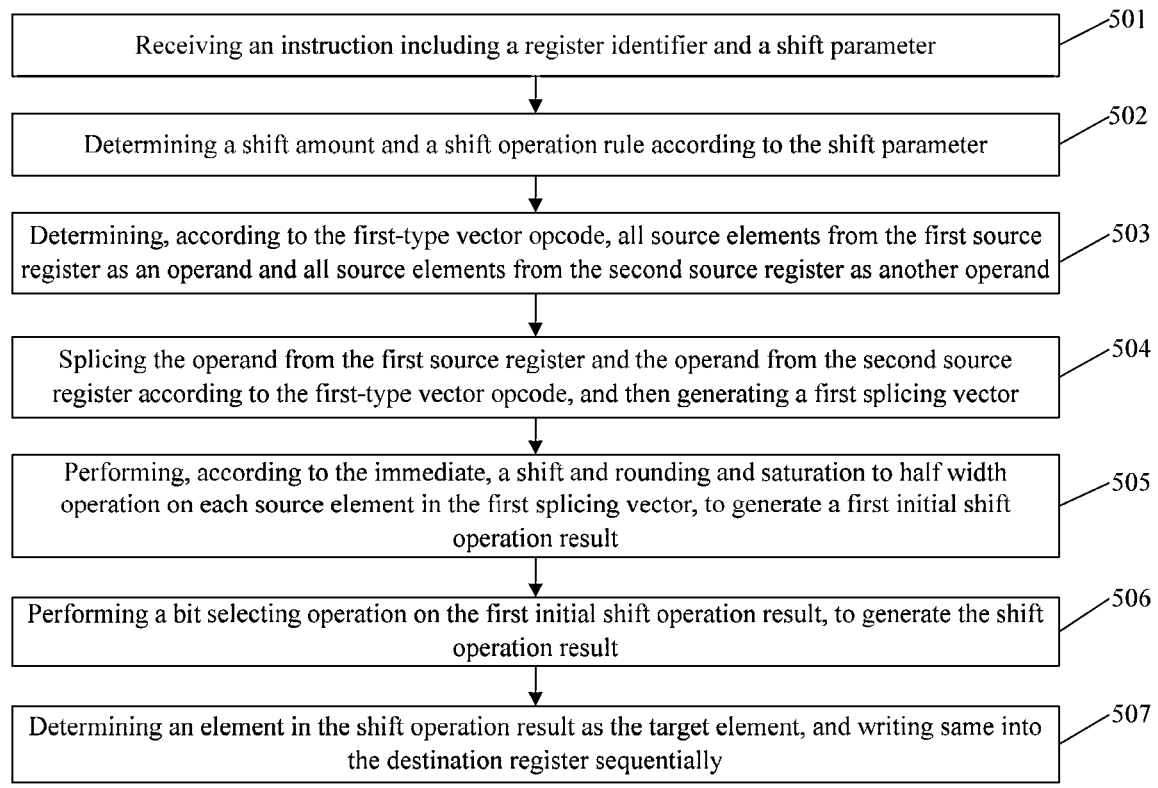
FIG. 5 is a flowchart illustrating steps of a vector shift method according to Embodiment II of the present application.

In the embodiment of the present application, the opcode may be a first-type vector opcode, and the source register includes a first source register and a second source register; a source element can be acquired from the source register through the first-type vector opcode, and a vector shift operation can be performed on the source element. As shown in FIG. 5, a processing manner of the vector shift instruction may include the following.

Step 501: receiving an instruction including a register identifier and a shift parameter.

In the embodiment of the present application, the meaning of the instruction and the parameter contained in the instruction are the same as those described in Embodiment I, which will not be described herein again.

In an implementation, there are two source registers in number, that is, the source element comes from two different registers; when there are plural source registers in number, each of all the source registers has a source register identifier different from the destination register identifier; or, when there are plural source registers in number, one of all the source registers has a source register identifier that is the same as the destination register identifier.

In an implementation, the received instruction is decoded to acquire the shift parameter contained in the instruction; the shift parameter is used to indicate a rule for the vector shift operation performed on the source element. In this example, the shift parameter may include parameters such as a shift amount and an opcode.

Step 502: determining a shift amount and a shift operation rule according to the shift parameter.

In the embodiment of the present application, the vector shift operation has at least one source element; the shift amount is an immediate; the shift operation rule is an opcode, and the opcode is a first-type vector opcode; and the immediate is a positive integer greater than or equal to 0.

In an implementation, the first-type vector opcode is code represented in a binary manner, or the opcode is an identifier convertible into binary code. The instruction is formatted as "opcode destination register, source register, shift amount". When the opcode is a first-type vector opcode, in a specific implementation, the instruction can be represented as "$VSSR_{first\ type}$. {B.H/H.W/W.D/D.Q/BU.H/HU.W/WU.D/DU.Q} vd, vj, $ui_{first\ type}$", where $VSSR_{first\ type}$ is the name of the instruction the vector in first-type opcode; {B.H/H.W/W.D/D.Q/BU.H/HU.W/WU.D/DU.Q} is a parameter for indicating a data type of a source element and a target element in the first-type opcode, B representing byte, H representing half-word, W representing word, D representing double-word, Q representing quad-word, and U representing unsigned; vd represents a destination register and a source register simultaneously, and vj represents a source register; and $ui_{first\ type}$ represents an immediate contained in the instruction when the opcode is a first-type vector opcode. Exemplarily, $VSSR_{first\ type\ 1}$.B.H is a first-type vector opcode that can be converted into a binary form, for example, $VSSR_{first\ type\ 1}$.B.H is converted into 011100110101000001, a first-type vector opcode in a binary form.

Further, $ui_{first\ type}$ is defined by the opcode, and a value thereof may refer to the data type of the source element and the target element; $ui_{first\ type}$ is a parameter within a pre-set range (namely, $ui_{first\ type} \in$[minimum, maximum]), that is, a minimum value of $ui_{first\ type}$ is determined according to the data type of the source element and the target element, and a maximum value of $ui_{first\ type}$ is infinity. Exemplarily, when the first-type vector opcode is $VSSR_{first\ type\ 1}$.B.H, a minimum value of $ui_{first\ type}$ is ui4; when the first-type vector opcode is $VSSR_{first\ type\ 1}$.H.W, a minimum value of $ui_{first\ type}$ is ui5; when the first-type vector opcode is $VSSR_{first\ type\ 1}$.W.D, a minimum value of $ui_{first\ type}$ is ui6; when the first-type vector opcode is $VSSR_{first\ type\ 1}$.D.Q, a minimum value of $ui_{first\ type}$ is ui7; when the first-type vector opcode is $VSSR_{first\ type\ 1}$.BU.H, a minimum value of $ui_{first\ type}$ is ui4; when the first-type vector opcode is $VSSR_{first\ type\ 1}$.HU.W, a minimum value of $ui_{first\ type}$ is ui5; when the first-type vector opcode is $VSSR_{first\ type\ 1}$.WU.D, a minimum value of $ui_{first\ type}$ is ui6; when the first-type vector opcode is $VSSR_{first\ type\ 1}$.DU.Q, a minimum value of $ui_{first\ type}$ is ui7. Thus, it can be seen that: $ui_{first\ type} \in$[ui4, infinity] when the data type of the source element is half-word and the data type of the target element is byte; $ui_{first\ type} \in$[ui5, infinity] when the data type of the source element is word and the data type of the target element is half-word; $ui_{first\ type} \in$[ui6, infinity] when the data type of the source element is double-word and the data type of the target element is word; $ui_{first\ type} \in$[ui7, infinity] when the data type of the source element is quad-word and the data type of the target element is double-word; where the target element may be unsigned or signed.

After the shift amount and the shift operation rule are determined according to the shift parameter, proceed with execution of step 503.

Step 503: determining, according to the first-type vector opcode, all source elements from the first source register as an operand and all source elements from the second source register as another operand.

In the embodiment of the present application, according to the first-type vector opcode, all elements from the first source register may be taken as the source element or some elements from the first source register may be taken as the source element; all elements from the second source register may be taken as the source element or some elements from the second source register may be taken as the source element. Exemplarily, if the first source register is a register vd and the second source register is a register vj, all elements from the first register vd may be determined as the source element while elements from the second register vj may be determined as the source element, and all source elements from the first source register may be determined as an operand while all source elements from the second source register may be determined as another operand.

In an implementation, the source elements selected from the first source register and the second source register have the same data type, and the data type of the source elements is any one of half-word, word, double-word, or quad-word.

After the source elements obtained from the first source register and the second source register are determined as the operands according to the first-type vector opcode, proceed with execution of step 504.

Step 504: splicing the operand from the first source register and the operand from the second source register according to the first-type vector opcode, and then generating a first splicing vector.

In the embodiment of the present application, after the operand from the first source register and the operand from the second source register are juxtaposed (side-by-side splicing), a first splicing vector is generated; where a location setting for juxtaposition of the operand from the first source register and the operand from the second source register is determined according to the locations of the source register identifiers in the instruction, that is, when the first source register identifier is a source register identifier in the instruction immediately following the first-type vector opcode, and the second source register identifier is a source register identifier in the instruction located after the first source register identifier, the operand from the first source register is located on the left side and the operand from the second source register is located on the right side, and the first splicing vector is generated; when the second source register identifier is a source register identifier in the instruction immediately following the first-type vector opcode, and the first source register identifier is a source register identifier in the instruction located after the second source register identifier, the operand from the second source register is located on the left side and the operand from the first source register is located on the right side, and the first splicing vector is generated. Exemplarily, when the instruction is formatted as "first-type vector opcode vd, vj, immediate", indicating that the first source register is vd, the second source register is vj, and the destination register is vd, then all the source elements from the first source register are integrally regarded as one operand, denoted as the operand$_{vd}$, all the source elements from the second source register are integrally regarded as another operand, denoted as the operand$_{vj}$, and the first splicing vector is "operand$_{vd}$ operand$_{vj}$".

In an implementation, the operand from the first source register and the operand from the second source register can also be cross-spliced in units of elements to generate the first splicing vector; when cross-spliced, the source elements with the same location information in the source registers are cross-spliced as a group, and the locations of different groups in the first splicing vector are sequentially arranged from high to low according to the addresses of the source elements; a location setting for juxtaposition of paired elements in different registers is determined according to the locations of the source register identifiers in the instruction, which is the same as the above-described example and thus will not be described here again.

Exemplarily, the operand from the first source register includes "source element 1 (location information a), source element 2 (location information b) and source element 3 (location information c)", and the operand from the second source register includes "source element 4 (location information a), source element 5 (location information b) and source element 6 (location information c)". Assuming that the source register identifier corresponding to the operand from the first source register is located at a position on the left side of the instruction, the source register identifier corresponding to the operand from the second source register is located at a position on the right side of the instruction, and the left side and the right side are opposite positions of location identifiers of the two source registers, a result obtained from juxtaposition of the two operands may be "source element 1, source element 2, source element 3, source element 4, source element 5, source element 6"; or, the source element 1 and the source element 4 that have the same location information a are regarded as a group for cross-splicing, the source element 2 and the source element 5 that have the same location information b are regarded as a group for cross-splicing, and the source element 3 and the source element 6 that have the same location information c are regarded as a group for cross-splicing, then the first splicing vector finally obtained is "source element 1, source element 4, source element 2, source element 5, source element 3, source element 6".

In an implementation, if the operand from the first source register is N bits and the operand from the second source register is N bits, then the first splicing vector is 2N bits, where N is a positive integer greater than 0. The number of bits of the operand from the first source register can be determined according to the element(s) contained in the first source register and the number of bits corresponding to the data type of the element(s); the number of bits of the operand from the second source register can be determined according to the element(s) contained in the second source register and the number of bits corresponding to the data type of the element(s).

After the first splicing vector is generated, proceed with execution of step 505.

Step 505: performing, according to the immediate, a shift and rounding and saturation to half width operation on each source element in the first splicing vector, to generate a first initial shift operation result.

In the embodiment of the present application, the first splicing vector contains a plurality of elements (source element); according to the immediate, a shift and rounding and saturation to half width operation is performed on each element in the first splicing vector, to generate a first initial shift operation result, where the shift amount is the immediate; the shift operation is a right shift operation, and the shift operation includes a logical shift and an arithmetic shift; the saturation to half width means numerical saturation processing on processed data according to a value range that can be expressed by binary data obtained by halving a data bit-width of the processed data, and the data after the processing is related to a prior-to-processing width; in an implementation, the data after the processing remains a multiple (e.g., ½) of the prior-to-processing width.

In an implementation, each source element in the first splicing vector is shifted with a same shift amount for each element, that is, the immediate. Exemplarily, if the first splicing vector includes an element 1, an element 2 and an element 3, and the shift amount is ui4, then shifting the first splicing vector means shifting the element 1 by ui4, shifting the element 2 by ui4 and shifting the element 3 by ui4, respectively; if an element contains a plurality of bits, right-shifting the element means right-shifting each bit in the element by a preset bit, discarding the bit in the element shifted beyond the rightmost, and setting a designated value at a left-side vacant position in the element; where both the preset bit and the designated value are values set according to specific situations.

In an implementation, performing the shift and rounding operation on each source element in the first splicing vector includes four rounding cases: rounding to even, rounding toward zero, rounding up and rounding down. Preferably, performing the shift and rounding operation on the first splicing vector means performing a shift roundup operation on the first splicing vector.

In an implementation, for any element x, the number of bits thereof is 2N, and the shift amount thereof is sa, performing a logical right shift and rounding and saturation to half width operation on the element x includes:
  step 1, obtaining an operation result A according to the shift amount; specifically, when the shift amount is 0, the obtained operation result A is the element x; when the shift amount is an integer greater than 0, an intermediate operation result is set, with the low bits of the intermediate operation result being data from the $sa^{-th}$ bit to a $(2N-1)^{-th}$ bit of the element x, and the remaining sa high bits are all 0, and the number of bits of the intermediate operation result is 2N; the intermediate operation result is added to (sa−1) bits of the element x to obtain the operation result A, where N is a positive integer greater than 0, and sa is the immediate; and
  step 2, acquiring a value of the operation result, comparing the value with the designated data, and obtaining a final operation result according to a comparison result. Specifically, the value of the operation result A is compared with $2^{N-1}$: if the operation result A is greater than $2^{N-1}$, then the final operation result is data with N bits being all 1; otherwise, the final operation result is the $0^{-th}$ bit to the $(N-1)^{-th}$ bit of the operation result A.

The element x is a signed vector or an unsigned vector.

In an implementation, for any element x, the number of bits thereof is 2N, and the shift amount thereof is sa, performing an arithmetic right shift and rounding and saturation to half width operation on the element x includes:
  step 1, obtaining an operation result A according to the shift amount; specifically, when the shift amount is 0, the obtained operation result A is the element x; when the shift amount is an integer greater than 0, an intermediate operation result is set, with the low bits of the intermediate operation result being data from the $sa^{-th}$ bit to a $(2N-1)^{-th}$ bit of the element x, and the remaining sa high bits are data of the $(2N-1)^{-th}$ bit of the element x, and the number of bits of the intermediate operation result is 2N; the intermediate operation result is added to (sa−1) bits of the element x to obtain the operation result A, where N is a positive integer greater than 0, and sa is the immediate; and
  step 2, acquiring a value of the operation result, comparing the value with the designated data, and obtaining a final operation result according to a comparison result. Specifically, the value of the operation result A is compared with $2^{N-1}$, and the value of the operation result A is compared with $-2^{N-1}$, respectively: if the operation result A is greater than $2^{N-1}$, then the final operation result is that the highest bit is 0 and the remaining low bits are 1, with the number of bits of the final operation result being N; if the operation result A is less than $-2^{N-1}$, then the final operation result is that the highest bit is 1 and the remaining low bits are 0, with the number of bits of the final operation result being N; if the operation result A is less than $2^{N-1}$ and greater than $-2^{N-1}$, then the final operation result is the $0^{-th}$ bit to the $(N-1)^{-th}$ bit of the operation result A, with the number of bits of the final operation result being N.

The saturation of the rounded data to half width includes signed saturation of the rounded data to half width and unsigned saturation of the rounded data to half width.

In conjunction with the embodiments of the present application, the final operation result in the foregoing examples is the element in the first initial shift operation result according to the embodiment of the present application, and the operation result A is the element in the first splicing vector according to the embodiment of the present application.

After the first initial shift operation result is generated by performing the shift and rounding and saturation to half width operation on the first splicing vector according to the immediate, proceed with execution of step 506.

Step 506: performing a bit selecting operation on the first initial shift operation result, to generate the shift operation result.

In the embodiment of the present application, the bit selecting operation includes any one of: selecting consecutive lower half data for each element contained in the first initial shift operation result, selecting consecutive higher half data for each element contained in the first initial shift operation result, selecting consecutive middle bit-designated data for each element contained in the first initial shift operation result, and selecting non-consecutive bit-designated data for each element contained in the first initial shift operation result.

After the shift operation result is generated by performing the bit selecting operation on the first initial shift operation result, proceed with execution of step 507.

Step 507: determining an element in the shift operation result as the target element, and writing same into the destination register sequentially.

In the embodiment of the present application, the data type of the target element is determined according to the data type of the source element; in an implementation, the number of bits corresponding to the data type of the target element is a half of the number of bits corresponding to the data type of the source element. Exemplarily, when the data type of the source element is half-word, the data type of the target element is byte; when the data type of the source element is word, the data type of the target element is half-word; when the data type of the source element is double-word, the data type of the target element is word; when the data type of the source element is quad-word, the data type of the target element is double-word. The source element can be signed data or unsigned data.

In an implementation, after the target element is determined, the target element is sequentially written into the destination register in a mode including: determining location information of each target element in the first initial shift operation result, and sequentially writing the target element into the destination register at a position matching the location information corresponding to the target element, where the location information represents a sequence of the element in the first initial shift operation result. Sequentially writing the target element into the destination register at the position matching the location information corresponding to the target element means sequentially writing the target element from high to low bits into the destination register at positions from the $(N/2-1)^{-th}$ bit to the $0^{-th}$ bit, or sequentially writing the target element from low to high bits into the destination register at positions from the $0^{-th}$ bit to the $(N/2-1)^{-th}$ bit.

In conjunction with the process of acquiring the target element according to the first-type vector opcode in the embodiment of the present application, the first-type vector opcode may further include four kinds (that is, a first vector opcode, a second vector opcode, a third vector opcode and a fourth vector opcode) to indicate different vector shift operations respectively, and detailed description will be made specifically in combination with the following four specific implementations.

In a first specific implementation of the present application, the first-type vector opcode is a first vector opcode, and a specific processing manner may include the following sub-steps.

Sub-step A1: performing, according to the immediate, a logical right shift and rounding and signed saturation to half width operation on each source element in the first splicing vector, to generate the first initial shift operation result.

In the embodiment of the present application, the first-type vector opcode may be a first vector opcode, and the first vector opcode can be used to indicate a logical right shift and rounding and signed saturation to half width operation on the first splicing vector; the first splicing vector is 2N bits, where N is a positive integer greater than 0, and N is 128 bits preferably.

In an implementation, logical right shift refers to a manner in which the element is shifted without consideration of a sign bit, that is, the highest bit is filled with 0 each time the element is right shifted by one bit. The signed saturation refers to saturation of a 16-bit number based on signed values of an 8-bit number within a range from −128 to +127. The half width refers to a half of bit width. For any vector, the process of performing the logical right shift and rounding and signed saturation to half width operation has been described hereinbefore, which will not be described here again.

When the first-type vector opcode is the first vector opcode, the logical right shift and rounding and signed saturation to half width operation can be performed on each source element in the first splicing vector according to the immediate, to generate the first initial shift operation result.

Sub-step A2: selecting, for each individual element contained in the first initial shift operation result, the consecutive lower half data thereof, and determining the element after the selecting operation as the shift operation result.

In the embodiment of the present application, after the first initial shift operation result is generated, it is possible to select, for each individual element contained in the first initial shift operation result, the consecutive lower half data thereof, and determine the element after the selecting operation as the shift operation result.

In an implementation, when each of the first source element and the second source element contained in the first source register is N/2 bits, each of the third source element and the fourth source element contained in the second source register is N/2 bits and the first initial shift operation result is N bits, then the shift operation result is data represented by the $0^{-th}$ bit to the $(N/2-1)^{-th}$ bit of the first initial shift operation result.

Furthermore, a lower half for each target element in the shift operation result is selected and sequentially written into a corresponding storage position of each target element in the destination register. Exemplarily, the first source register is a vector register vd, the second source register is a vector register vj, the vector register vd contains a first source element and a second source element, the vector register vj contains a third source element and a fourth source element, the number of bits of each of the first source element, the second source element, the third source element and the fourth source element is N/2, and the first source element, the second source element, the third source element and the fourth source element can be spliced side by side to form a 2N (2N=256)-bit vector through a vector shift instruction; each source element in the vector is separately performed with a logical right shift and rounding and signed saturation to half width operation, and the shift amount stems from the immediate. Lower half elements for the shift result of the first source element are selected as a target element, lower half elements for the shift result of the second source element are selected as a target element, lower half elements for the shift result of the third source element are selected as a target element and lower half elements for the shift result of the fourth source element are selected as a target element, for writing into the vector register vd in sequence.

Understandably, the foregoing example is an example only enumerated for the purpose of better understanding the technical solution of the embodiment of the present application and is not intended to solely limit the embodiment of the present application.

In a second specific implementation of the present application, the first-type vector opcode is a second vector opcode, and a specific processing manner may include the following sub-steps.

Sub-step B1: performing, according to the immediate, an arithmetic right shift and rounding and signed saturation to half width operation on each source element in the first splicing vector, to generate the first initial shift operation result.

In the embodiment of the present application, the first-type vector opcode may be a second vector opcode, and the second vector opcode can be used to indicate an arithmetic right shift and rounding and signed saturation to half width operation on the first splicing vector; the first splicing vector is 2N bits, where N is a positive integer greater than 0, and N is 128 bits preferably.

In an implementation, arithmetic right shift refers to a manner in which the element is shifted with consideration of a sign bit, that is, each time the element is right shifted by one bit, the highest leftmost bit is filled with 1 if the sign bit is 1, otherwise the highest leftmost bit is filled with 0. The meanings of signed saturation and half width are the same as those in the description hereinbefore, and detailed description will not be made here again. For any vector, the process of performing the arithmetic right shift and rounding and signed saturation to half width operation has been described hereinbefore, which will not be described here again.

When the first-type vector opcode is the second vector opcode, the arithmetic right shift and rounding and signed saturation to half width operation can be performed on each source element in the first splicing vector according to the immediate, to generate the first initial shift operation result.

After the first initial shift operation result is generated by performing, according to the immediate, the arithmetic right shift and rounding and signed saturation to half width operation on the first splicing vector, proceed with execution of sub-step B2.

Sub-step B2: selecting, for each individual element contained in the first initial shift operation result, the consecutive lower half data thereof, and determining the element after the selecting operation as the shift operation result.

In the embodiment of the present application, after the first initial shift operation result is generated, it is possible to select, for each individual element contained in the first initial shift operation result, the consecutive lower half data thereof, and determine the element after the selecting operation as the shift operation result.

In an implementation, when each of the first source element and the second source element contained in the first source register is N/2 bits, each of the third source element and the fourth source element contained in the second source register is N/2 bits and the first initial shift operation result is N bits, then the shift operation result is data represented by the $0^{-th}$ bit to the $(N/2-1)^{-th}$ bit of the first initial shift operation result.

Furthermore, a lower half for each target element in the shift operation result is selected and sequentially written into a corresponding storage position of each target element in the destination register. Exemplarily, the first source register is a vector register vd, the second source register is a vector register vj, the vector register vd contains a first source element and a second source element, the vector register vj contains a third source element and a fourth source element, the number of bits of each of the first source element, the second source element, the third source element and the fourth source element is N/2, and the first source element, the second source element, the third source element and the fourth source element can be spliced side by side to form a 2N (2N=256)-bit vector through a vector shift instruction; each source element in the vector is separately performed with an arithmetic right shift and rounding and signed saturation to half width operation, and the shift amount stems from the immediate. Lower half elements for the shift result of the first source element are selected as a target element, lower half elements for the shift result of the second source element are selected as a target element, lower half elements for the shift result of the third source element are selected as a target element and lower half elements for the shift result of the fourth source element are selected as a target element, for writing into the vector register vd in sequence.

Understandably, the foregoing example is an example only enumerated for the purpose of better understanding the technical solution of the embodiment of the present application and is not intended to solely limit the embodiment of the present application.

In a third specific implementation of the present application, the first-type vector opcode is a third vector opcode, and a specific processing manner may include the following sub-steps.

Sub-step C1: performing, according to the immediate, a logical right shift and rounding and unsigned saturation to half width operation on each source element in the first splicing vector, to generate the first initial shift operation result.

In the embodiment of the present application, the first-type vector opcode may be a third vector opcode, and the third vector opcode can be used to indicate a logical right shift and rounding and unsigned saturation to half width operation on the first splicing vector; the first splicing vector is 2N bits, where N is a positive integer greater than 0, and N is 128 bits preferably.

In an implementation, the rounding and unsigned saturation refers to saturation of a 16-bit number based on signed values of an 8-bit number within a range from 0 to 255. The meanings of logical right shift and saturation to half width are the same as those in the description hereinbefore, and detailed description will not be made here again. For any vector, the process of performing the logical right shift and rounding and unsigned saturation to half width operation has been described hereinbefore, which will not be described here again.

When the first-type vector opcode is the third vector opcode, the logical right shift and rounding and unsigned saturation to half width operation can be performed on each source element in the first splicing vector according to the immediate, to generate the first initial shift operation result.

After the first initial shift operation result is generated by performing, according to the immediate, the logical right shift and rounding and unsigned saturation to half width operation on the first splicing vector, proceed with execution of sub-step C2.

Sub-step C2: selecting, for each individual element contained in the first initial shift operation result, the consecutive lower half data thereof, and determining the element after the selecting operation as the shift operation result.

In the embodiment of the present application, after the first initial shift operation result is generated, it is possible to select, for each individual element contained in the first initial shift operation result, the consecutive lower half data thereof, and determine the element after the selecting operation as the shift operation result.

In an implementation, when each of the first source element and the second source element contained in the first source register is N/2 bits, each of the third source element and the fourth source element contained in the second source register is N/2 bits and the first initial shift operation result is N bits, then the shift operation result is data represented by the $0^{-th}$ bit to the $(N/2-1)^{-th}$ bit of the first initial shift operation result.

Furthermore, a lower half for each target element in the shift operation result is selected and sequentially written into a corresponding storage position of each target element in the destination register. Exemplarily, the first source register is a vector register vd, the second source register is a vector register vj, the vector register vd contains a first source element and a second source element, the vector register vj contains a third source element and a fourth source element, the number of bits of each of the first source element, the second source element, the third source element and the fourth source element is N/2, and the first source element, the second source element, the third source element and the fourth source element can be spliced side by side to form a 2N (2N=256)-bit vector through a vector shift instruction; each source element in the vector is separately performed with a logical right shift and rounding and unsigned saturation to half width operation, and the shift amount stems from the immediate. Lower half elements for the shift result of the first source element are selected as a target element, lower half elements for the shift result of the second source element are selected as a target element, lower half elements for the shift result of the third source element are selected as a target element and lower half elements for the shift result of the fourth source element are selected as a target element, for writing into the vector register vd in sequence.

Understandably, the foregoing example is an example only enumerated for the purpose of better understanding the technical solution of the embodiment of the present application and is not intended to solely limit the embodiment of the present application.

In a fourth specific implementation of the present application, the first-type vector opcode is a fourth vector opcode, and a specific processing manner may include the following sub-steps.

Sub-step D1: performing, according to the immediate, an arithmetic right shift and rounding and unsigned saturation to half width operation on each source element in the first splicing vector, to generate the first initial shift operation result.

In the embodiment of the present application, the first-type vector opcode may be a fourth vector opcode, and the fourth vector opcode can be used to indicate an arithmetic right shift and rounding and unsigned saturation to half width operation on the first splicing vector; the first splicing vector is 2N bits, where N is a positive integer greater than 0, and N is 128 bits preferably.

In an implementation, the meanings of arithmetic right shift, rounding and half width are the same as those in the description hereinbefore, and detailed description will not be made here again. The meanings of arithmetic right shift and saturation to half width are the same as those in the description hereinbefore, and detailed description will not be made here again. For any vector, the process of performing the arithmetic right shift unsigned saturation to half width operation has been described hereinbefore, which will not be described here again.

When the first-type vector opcode is the fourth vector opcode, the arithmetic right shift and rounding and unsigned saturation to half width operation can be performed on each source element in the first splicing vector according to the immediate, to generate the first initial shift operation result.

After the first initial shift operation result is generated by performing, according to the immediate, the arithmetic right shift and rounding and unsigned saturation to half width operation on the first splicing vector, proceed with execution of sub-step D2.

Sub-step D2: selecting, for each individual element contained in the first initial shift operation result, the consecutive lower half data thereof, and determining the element after the selecting operation as the shift operation result.

In the embodiment of the present application, after the first initial shift operation result is generated, it is possible to select, for each individual element contained in the first initial shift operation result, the consecutive lower half data thereof, and determine the element after the selecting operation as the shift operation result.

In an implementation, when each of the first source element and the second source element contained in the first source register is N/2 bits, each of the third source element and the fourth source element contained in the second source register is N/2 bits and the first initial shift operation result is N bits, then the shift operation result is data represented by the $0^{-th}$ bit to the $(N/2-1)^{-th}$ bit of the first initial shift operation result.

Furthermore, a lower half for each target element in the shift operation result is selected and sequentially written into a corresponding storage position of each target element in the destination register. Exemplarily, the first source register is a vector register vd, the second source register is a vector register vj, the vector register vd contains a first source element and a second source element, the vector register vj contains a third source element and a fourth source element, the number of bits of each of the first source element, the second source element, the third source element and the fourth source element is N/2, and the first source element, the second source element, the third source element and the fourth source element can be spliced side by side to form a 2N (2N=256)-bit vector through a vector shift instruction; each source element in the vector is separately performed with an arithmetic right shift and rounding and unsigned saturation to half width operation, and the shift amount stems from the immediate. Lower half elements for the shift result of the first source element are selected as a target element, lower half elements for the shift result of the second source element are selected as a target element, lower half elements for the shift result of the third source element are selected as a target element and lower half elements for the shift result of the fourth source element are selected as a target element, for writing into the vector register vd in sequence.

Understandably, the foregoing example is an example only enumerated for the purpose of better understanding the technical solution of the embodiment of the present application and is not intended to solely limit the embodiment of the present application.

With the technical solution of the present application, a series of actions such as logical shift, rounding, signed saturation to half width are achieved for two source elements by executing an instruction containing the first vector opcode and the immediate; a series of actions such as arithmetic shift, rounding, signed saturation to half width are achieved for two source elements by executing an instruction containing the second vector opcode and the immediate; a series of actions such as logical shift, rounding, unsigned saturation to half width are achieved for two source elements by executing an instruction containing the third vector opcode and the immediate; a series of actions such as arithmetic shift, rounding, unsigned saturation to half width are achieved for two source elements by executing an instruction containing the fourth vector opcode and the immediate. Therefore, with the technical solution of the present disclosure, different shift requirements can be achieved through different shift parameters, and thus the use of a single shift instruction can achieve a variety of vector shift requirements, thereby effectively reducing the system overhead and improving the execution efficiency for the specific vector shift purpose.

Embodiment III

Figure 6:
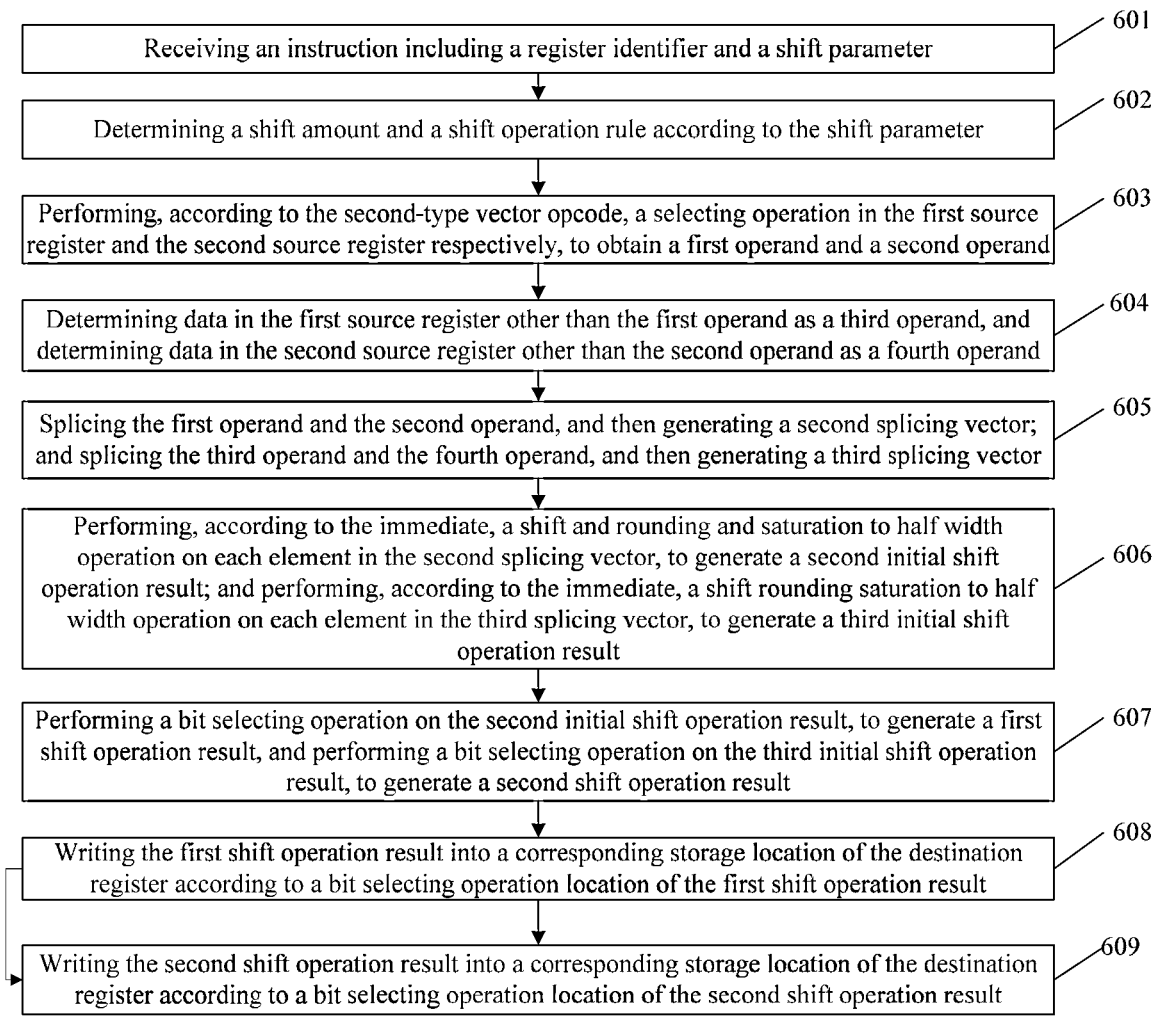
FIG. 6 is a flowchart illustrating steps of a vector shift method according to Embodiment III of the present application.

In the embodiment of the present application, the opcode may be a second-type vector opcode, and the source register includes a first source register and a second source register; the second-type vector opcode can be used to give an indication to perform a selecting operation in the first source register and the second source register respectively, and perform a corresponding vector shift operation. As shown in FIG. 6, a processing method of the vector shift instruction may include the following.

Step 601: receiving an instruction including a register identifier and a shift parameter.

In the embodiment of the present application, the meaning of the instruction and the parameter contained in the instruction are the same as those described in Embodiment I and Embodiment II, which will not be described herein again.

In an implementation, there are two source registers in number, that is, the source element comes from two different registers; when there are plural source registers in number, each of all the source registers has a source register identifier different from the destination register identifier; or, when there are plural source registers in number, one of all the source registers has a source register identifier that is the same as the destination register identifier. Compared to Embodiment II, the number of bits for the source register and the destination register in the embodiment of the present application is twice the number of bits for the source register and the destination register in Embodiment II; exemplarily, if the number of bits for the source register in the embodiment of the present application is 256 bits, then the number of bits for the source register in Embodiment II is 128 bits.

In an implementation, the received instruction is decoded to acquire the shift parameter contained in the instruction; the shift parameter is used to indicate a rule for the vector shift operation performed on the source element. In this example, the shift parameter may include parameters such as a shift amount and an opcode.

Step 602: determining a shift amount and a shift operation rule according to the shift parameter.

In the embodiment of the present application, the vector shift operation has at least one source element; the shift amount is an immediate; the shift operation rule is an opcode, and the opcode is a second-type vector opcode; and the immediate is a positive integer greater than or equal to 0.

In an implementation, the second-type vector opcode is code represented in a binary manner, or the opcode is an identifier convertible into binary code. The instruction is formatted as "opcode destination register, source register, shift amount". When the opcode is a second-type vector opcode, in a specific implementation, the instruction can be represented as "$XVSSR_{second\ type}.\{B.H/H.W/W.D/D.Q/BU.H/HU.W/WU.D/DU.Q\}$ xd, xj, $ui_{second\ type}$", where $XVSSR_{second\ type}$ is the name of the instruction in the second-type vector opcode; {B.H/H.W/W.D/D.Q/BU.H/HU.W/WU.D/DU.Q} is a parameter for indicating a data type of a source element and a target element in the second-type vector opcode, B representing byte, H representing half-word, W representing word, D representing double-word, Q representing quad-word, and U representing unsigned; xd represents a destination register and a source register simultaneously, and xj represents a source register; and $ui_{second\ type}$ represents an immediate contained in the instruction when the opcode is a second-type vector opcode. Exemplarily, $XVSSR_{second\ type\ 1}.B.H$ is a second-type vector opcode that can be converted into a binary form, for example, $XVSSR_{second\ type\ 1}.B.H$ is converted into 011101110101000001, a second-type vector opcode in a binary form.

Further, $ui_{second\ type}$ is a parameter defined based on the data type of the source element and the target element; the value range and the value mode of $ui_{second\ type}$ are the same as those of $ui_{first\ type}$ in Embodiment II, and details will not be described here again.

After the shift amount and the shift operation rule are determined according to the shift parameter, proceed with execution of step 603.

Step 603: performing, according to the second-type vector opcode, a selecting operation in the first source register and the second source register respectively, to obtain a first operand and a second operand.

In the embodiment of the present application, according to the second-type vector opcode, a selecting operation is performed in the first source register to obtain a first operand, and a selecting operation is performed in the second source register to obtain a second operand; where the first operand and the second operand have the same data type, and the source element in the first operand and the element in the second operand have any one of the following data types: half-word, word, double-word and quad-word.

In an implementation, the selecting operation includes any one of: selecting consecutive lower half data for each element in the first source register and the second source register, selecting consecutive higher half data for each element in the first source register and the second source register, selecting consecutive middle bit-designated data for each element in the first source register and the second source register, and selecting non-consecutive bit-designated data for each element in the first source register and the second source register.

In an implementation, the same selecting operation is performed in the first source register and the second source register. Exemplarily, for example, performing the selecting operation on the first source register means selecting consecutive lower half data from each element contained in the first source register, while performing the selecting operation on the second source register means selecting consecutive lower half data from each element contained in the second source register; for another example, performing the selecting operation on the first source register means selecting consecutive higher half data from each element contained in the first source register, while performing the selecting operation on the second source register means selecting consecutive higher half data from each element contained in the second source register; for yet another example, performing the selecting operation on the first source register means selecting consecutive middle bit-designated data from each element contained in the first source register, while performing the selecting operation on the second source register means selecting consecutive middle bit-designated data from each element contained in the second source register; for yet another example, performing the selecting operation on the first source register means selecting non-consecutive bit-designated data from each element contained in the first source register, while performing the selecting operation on the second source register means selecting non-consecutive bit-designated data from each element contained in the second source register.

After the first operand and the second operand are obtained by performing, according to the second-type vector opcode, the selecting operation in the first source register and the second source register respectively, proceed with execution of step 604.

Step 604: determining data in the first source register other than the first operand as a third operand, and determining data in the second source register other than the second operand as a fourth operand.

In the embodiment of the present application, the third operand and the fourth operand have the same data type as the first operand and the second operand, and the source element in the third operand and the element in the fourth operand have any one of the following data types: half-word, word, double-word and quad-word.

In an implementation, the data in the first source register other than the first operand is determined as the third operand, and the data in the second source register other than the second operand is determined as the fourth operand. Exemplarily, when the first operand is the consecutive lower half data of each element contained in the first source register, the third operand is the consecutive higher half data of each element contained in the first source register; likewise, when the second operand is the consecutive lower half data of each element in the first source register, the fourth operand is the consecutive higher half data of each element contained in the first source register.

After the first operand, the second operand, the third operand and the fourth operand are obtained, proceed with execution of step 605.

Step 605: splicing the first operand and the second operand, and then generating a second splicing vector; and splicing the third operand and the fourth operand, and then generating a third splicing vector.

In the embodiment of the present application, after the first operand and the second operand are juxtaposed (side-by-side splicing), a second splicing vector is generated; where a location setting for juxtaposition of the first operand and the second operand is determined according to the locations of the source register identifiers in the instruction, that is, when the first source register identifier is a source register identifier in the instruction immediately following the second-type vector opcode, and the second source register identifier is a source register identifier in the instruction located after the first source register identifier, since the first operand stems from the first source register and the second operand stems from the second source register, the first operand is located on the left side and the second operand is located on the right side, and the second splicing vector is generated; when the second source register identifier is a source register identifier in the instruction immediately following the second-type vector opcode, and the first source register identifier is a source register identifier in the instruction located after the second source register identifier, since the first operand stems from the first source register and the second operand stems from the second source register, the second operand is located on the left side and the first operand is located on the right side, and the second splicing vector is generated. Exemplarily, when the instruction is formatted as "second-type vector opcode vd, vj, immediate", indicating that the first source register is vd, the second source register is vj, and the destination register is vd, then the first operand stems from vd (denoted as the first operand$_{vd}$), the second operand stems from vj (denoted as the second operand$_{vj}$), and the second splicing vector is "first operand$_{vd}$, second operand$_{vj}$"; likewise, when the instruction is formatted as "second-type vector opcode vd, vj, immediate", indicating that the second source register is vd, the first source register is vj, and the destination register is vd, then the second operand stems from vd (denoted as the second operand$_{vd}$), the first operand stems from vj (denoted as the first operand$_{vj}$), and the second splicing vector is "second operand$_{vd}$, first operand$_{vj}$". The manner in which the third splicing vector is generated from the third operand and the fourth operand is the same as the manner in which the second splicing vector is generated from the first operand and the second operand, and details will not be described here again.

In an implementation, the first operand and the second operand can also be cross-spliced in units of elements to generate the second splicing vector; when cross-spliced, the source elements with the same address in the source registers are cross-spliced as a group, and the locations of different groups in the second splicing vector are sequentially arranged from high to low according to the addresses of the source elements; a location setting for juxtaposition of paired elements in different registers is determined according to the locations of the source register identifiers in the instruction, which is the same as the above-described example and thus will not be described here again. Exemplarily, the first operand includes "source element 1 (address a), source element 2 (address b) and source element 3 (address c)", and the second operand includes "source element 4 (address a), source element 5 (address b) and source element 6 (address c)", the source element 1 and the source element 4 that have the same address a are regarded as a group for cross-splicing, the source element 2 and the source element 5 that have the same address b are regarded as a group for cross-splicing, the source element 3 and the source element 6 that have the same address c are regarded as a group for cross-splicing, assuming that the source register identifier corresponding to the first operand is located at a position on the left side of the instruction, and the source register identifier corresponding to the second operand is located at a position on the right side of the instruction, then the second splicing vector finally obtained is "source element 1, source element 4, source element 2, source element 5, source element 3, source element 6". The manner in which the third splicing vector is generated from the third operand and the fourth operand is the same as the manner in which the second splicing vector is generated from the first operand and the second operand, and details will not be described here again.

In an implementation, if the total number of bits of the first operand is N bits and the total number of bits of the second operand is N bits, then the second splicing vector is 2N bits; likewise, if the total number of bits of the third operand is N bits and the total number of bits of the fourth operand is N bits, then the third splicing vector is 2N bits, where N is a positive integer greater than 0. The total number of bits of the first operand can be determined according to the element(s) contained therein and the number of bits corresponding to the data type of the element(s); the total number of bits of the second operand can be determined according to the element(s) contained therein and the number of bits corresponding to the data type of the element(s).

After the second splicing vector and the third splicing vector are obtained, proceed with execution of step 606.

Step 606: performing, according to the immediate, a shift and rounding and saturation to half width operation on each element in the second splicing vector, to generate a second initial shift operation result; and performing, according to the immediate, a shift and rounding and saturation to half width operation on each element in the third splicing vector, to generate a third initial shift operation result.

In the embodiment of the present application, the second splicing vector contains a plurality of elements; performing, according to the immediate, the shift and rounding and saturation to half width operation on the second splicing vector means performing a shift and rounding and saturation to half width operation on each element in the second splicing vector to generate a second initial shift operation result, where the shift amount is the immediate; likewise, the third splicing vector contains a plurality of elements; performing, according to the immediate, the shift and rounding and saturation to half width operation on the third splicing vector means performing a shift and rounding and saturation to half width operation on each element in the third splicing vector to generate a third initial shift operation result, where the shift amount is the immediate. The shift operation is a right shift operation, and the shift operation includes a logical shift and an arithmetic shift.

In an implementation, shifting the second splicing vector includes: performing a shift operation on each element in the second splicing vector, where the shift amount is the immediate, that is, each element has a same shift amount which is the immediate. Exemplarily, if the second splicing vector includes an element 1, an element 2 and an element 3, and the shift amount is ui4, then shifting the second splicing vector means shifting the element 1 by ui4, shifting the element 2 by ui4 and shifting the element 3 by ui4, respectively.

In an implementation, shifting the third splicing vector includes: performing a shift operation on each element in the third splicing vector, where the shift amount is the immediate, that is, each element has a same shift amount which is the immediate. Exemplarily, if the third splicing vector includes an element 4, an element 5 and an element 6, and the shift amount is ui4, then shifting the third splicing vector means shifting the element 4 by ui4, shifting the element 5 by ui4 and shifting the element 6 by ui4, respectively.

In an implementation, performing the shift and rounding operation on the second splicing vector/third splicing vector includes four rounding cases: rounding to even, rounding toward zero, rounding up and rounding down. Preferably, performing the shift and rounding operation on the second splicing vector/third splicing vector means performing a shift roundup operation on the second splicing vector/third splicing vector.

The method for performing the logical right shift and rounding and saturation to half width operation on the second splicing vector/third splicing vector is the same as that described in Embodiment II, and details will not be described here again; likewise, the method for performing the arithmetic right shift and rounding and saturation to half width operation on the second splicing vector/third splicing vector is the same as that described in Embodiment II, and details will not be described here again.

After the second initial shift operation result and the third initial shift operation result are generated, proceed with execution of step 607.

Step 607: performing a bit selecting operation on the second initial shift operation result, to generate a first shift operation result, and performing a bit selecting operation on the third initial shift operation result, to generate a second shift operation result.

In the embodiment of the present application, the performing the bit selecting operation includes any one of: selecting consecutive lower half data for each element contained in the second initial shift operation result and each element contained in the third initial shift operation result, selecting consecutive higher half data for each element contained in the second initial shift operation result and each element contained in the third initial shift operation result, selecting consecutive middle bit-designated data for each element contained in the second initial shift operation result and each element contained in the third initial shift operation result, and selecting non-consecutive bit-designated data for each element contained in the second initial shift operation result and each element contained in the third initial shift operation result.

After the first shift operation result and the second shift operation result are generated, proceed with execution of step 608 and step 609.

Step 608: writing the first shift operation result into a corresponding storage location of the destination register according to a bit selecting operation location of the first shift operation result.

Step 609: writing the second shift operation result into a corresponding storage location of the destination register according to a bit selecting operation location of the second shift operation result.

In the embodiment of the present application, the elements in the first shift operation result and the second shift operation result are regarded as target elements for writing into the corresponding storage positions of the destination register.

In an implementation, the data type of the target element is determined according to the data type of the source element; in an implementation, the number of bits corresponding to the data type of the target element is a half of the number of bits corresponding to the data type of the source element. Exemplarily, when the data type of the source element is half-word, the data type of the target element is byte; when the data type of the source element is word, the data type of the target element is half-word; when the data type of the source element is double-word, the data type of the target element is word; when the data type of the source element is quad-word, the data type of the target element is double-word. The source element can be signed data or unsigned data.

In an implementation, after target elements are determined, the target elements are sequentially written into the destination register in a mode including: determining location information of each target element in the second shift operation result and the third shift operation result, and sequentially writing the target elements into the destination register at positions matching the location information corresponding to the target elements, where the location information represents a sequence of the elements in the second shift operation result and the third shift operation result. Sequentially writing the target elements into the destination register at the positions matching the location information corresponding to the target elements means: determining the storage location of each target element in the destination register; for each target element, storing the target element from the second shift operation result into a higher half of the storage location of the target element, and storing the target element from the third shift operation result into a lower half of the storage location of the target element; or, for each target element, storing the target element from the second shift operation result into a lower half of the storage location of the target element, and storing the target element from the third shift operation result into a higher half of the storage location of the target element.

In conjunction with the process of acquiring the target element according to the second-type vector opcode in the embodiment of the present application, the second-type vector opcode may include a fifth vector opcode, a sixth vector opcode, a seventh vector opcode and an eighth vector opcode to indicate different vector shift operations respectively, and detailed description will be made specifically in combination with the following specific implementations.

In a first specific implementation of the embodiment of the present application, the second-type vector opcode is a fifth vector opcode, the first operand is the consecutive lower half data of each element from the first source register; the second operand is the consecutive lower half data of each element from the second source register; the third operand is the consecutive higher half data of each element from the first source register; the fourth operand is the consecutive higher half data of each element from the second source register, and a specific processing manner may include the following sub-steps.

Sub-step E1: performing, according to the immediate, a logical right shift and rounding and signed saturation to half width operation on each element in the second splicing vector, to generate the second initial shift operation result; and performing, according to the immediate, a logical right shift and rounding and signed saturation to half width operation on each element in the third splicing vector, to generate the third initial shift operation result.

In the embodiment of the present application, the second-type vector opcode may be a fifth vector opcode, where the fifth vector opcode can be used to: indicate a logical right shift and rounding and signed saturation to half width operation on the second splicing vector, and a selecting operation on data in each element; and indicate a logical right shift and rounding and signed saturation to half width operation on the third splicing vector, and a selecting operation on data in each element. Each of the second splicing vector and the third splicing vector is 2N bits, where N is a positive integer greater than 0, and N is 128 bits preferably. The definitions of logical right shift, rounding, half width and signed saturation are the same as those in Embodiment II, and the process of performing the logical right shift and rounding and signed saturation to half width operation is the same as that in Embodiment II, both of which will not be described here again.

After the second initial shift operation result and the third initial shift operation result are generated, proceed with execution of sub-step E2.

Sub-step E2: selecting, for each individual element contained in the second initial shift operation result, the consecutive lower half data thereof, and determining the selected data as the first shift operation result; and selecting, for each individual element contained in the third initial shift operation result, the consecutive higher half data thereof, and determining the selected data as the second shift operation result.

In the embodiment of the present application, at least one first target element is determined according to the data contained in the first shift operation result, and at least one second target element is determined according to the element contained in the second shift operation result.

After the first shift operation result and the second shift operation result are obtained, proceed with execution of sub-step E3 and sub-step E4.

Sub-step E3: writing each first target element contained in the first shift operation result into a lower half of a position of the each first target element in the destination register.

Sub-step E4: writing each second target element contained in the second shift operation result into a higher half of a position of the each second target element in the destination register.

In an implementation, when the total number of bits of the first operand is N bits, the total number of bits of the second operand is N bits and the second initial shift operation result is N bits, then the first shift operation result is data represented by the $0^{-th}$ bit to the $(N/2-1)^{-th}$ bit of the second initial shift operation result. Exemplarily, the first source register is a vector register xd; the second source register is a vector register xj; the lower half data of each element in xd is regarded as the first operand; the lower half data of each element in xj is regarded as the second operand; the first operand and the second operand can be spliced side by side to form a 2N (2N=256)-bit vector through a vector shift instruction; each element in the vector is separately performed with a logical right shift and rounding and signed saturation to half width operation, the shift amount stems from the immediate; after the lower half is selected for each element contained in the second initial shift operation result, each element after the lower half selecting operation is regarded as a first target element, for writing into the lower half of the position of each first target element in the vector register xd. The source element in the first operand and the source element in the second operand have any one of the following data types: half-word, word, double-word and quad-word. The source element in the first operand and the source element in the second operand have the same data type; corresponding to the data type of the source element mentioned above, the data type of the target element written into the vector register xd is byte, half-word, word, or double-word. The correspondence between the data type of the source element and the data type of the target element has been described hereinbefore, and details will not be described here again.

In an implementation, when the total number of bits of the third operand is N bits, the total number of bits of the fourth operand is N bits and the third initial shift operation result is N bits, then the second shift operation result is data represented by the $(N/2)^{-th}$ bit to the $(N-1)^{-th}$ bit of the third initial shift operation result. Exemplarily, the first source register is a vector register xd; the second source register is a vector register xj; the higher half data of each element in xd is regarded as the third operand; the higher half data of each element in xj is regarded as the fourth operand; the third operand and the fourth operand can be spliced side by side to form a 2N (2N=256)-bit vector through a vector shift instruction; each element in the vector is separately performed with a logical right shift and rounding and signed saturation to half width operation, the shift amount stems from the immediate; after the higher half is selected for each element contained in the third initial shift operation result, each element after the higher half selecting operation is regarded as a second target element, for writing into the higher half of the position of each second target element in the vector register xd. The source element in the third operand and the source element in the fourth operand have any one of the following data types: half-word, word, double-word and quad-word. The source element in the third operand and the source element in the fourth operand have the same data type; corresponding to the data type of the source element mentioned above, the data type of the target element written into the vector register xd is byte, half-word, word, or double-word. The correspondence between the data type of the source element and the data type of the target element has been described hereinbefore, and details will not be described here again.

Understandably, the foregoing example is an example only enumerated for the purpose of better understanding the technical solution of the embodiment of the present application and is not intended to solely limit the embodiment of the present application.

In a second specific implementation of the embodiment of the present application, the second-type vector opcode is a sixth vector opcode, the first operand is the consecutive lower half data of each element from the first source register; the second operand is the consecutive lower half data of each element from the second source register; the third operand is the consecutive higher half data of each element from the first source register; the fourth operand is the consecutive higher half data of each element from the second source register, and a specific processing manner may include the following sub-steps.

Sub-step F1: performing, according to the immediate, an arithmetic right shift and rounding and signed saturation to half width operation on each element in the second splicing vector, to generate the second initial shift operation result; and performing, according to the immediate, an arithmetic right shift and rounding and signed saturation to half width operation on each element in the third splicing vector, to generate the third initial shift operation result.

In the embodiment of the present application, the second-type vector opcode may be a sixth vector opcode, where the sixth vector opcode can be used to: indicate an arithmetic right shift and rounding and signed saturation to half width operation on the second splicing vector, and a selecting operation on data in each element; and indicate an arithmetic right shift and rounding and signed saturation to half width operation on the third splicing vector, and a selecting operation on data in each element. Each of the second splicing vector and the third splicing vector is 2N bits, where N is a positive integer greater than 0, and N is 128 bits preferably. The definitions of arithmetic right shift, rounding, half width and signed saturation are the same as those in Embodiment II, and the process of performing the arithmetic right shift and rounding and signed saturation to half width operation is the same as that in Embodiment II, both of which will not be described here again.

After the second initial shift operation result and the third initial shift operation result are generated, proceed with execution of sub-step F2.

Sub-step F2: selecting, for each individual element contained in the second initial shift operation result, the consecutive lower half data thereof, and determining the selected data as the first shift operation result; and selecting, for each individual element contained in the third initial shift operation result, the consecutive higher half data thereof, and determining the selected data as the second shift operation result.

In the embodiment of the present application, at least one first target element is determined according to the data contained in the first shift operation result, and at least one second target element is determined according to the element contained in the second shift operation result.

After the first shift operation result and the second shift operation result are obtained, proceed with execution of sub-step F3 and sub-step F4.

Sub-step F3: writing each first target element contained in the first shift operation result into a lower half of a position of the each first target element in the destination register.

Sub-step F4: writing each second target element contained in the second shift operation result into a higher half of a position of the each second target element in the destination register.

In an implementation, when the total number of bits of the first operand is N bits, the total number of bits of the second operand is N bits and the second initial shift operation result is N bits, then the first shift operation result is data represented by the $0^{-th}$ bit to the $(N/2-1)^{-th}$ bit of the second initial shift operation result. Exemplarily, the first source register is a vector register xd; the second source register is a vector register xj; the lower half data of each element in xd is regarded as the first operand; the lower half data of each element in xj is regarded as the second operand; the first operand and the second operand can be spliced side by side to form a 2N (2N=256)-bit vector through a vector shift instruction; each element in the vector is separately performed with an arithmetic right shift and rounding and signed saturation to half width operation, the shift amount stems from the immediate; after the lower half is selected for each element contained in the second initial shift operation result, each element after the lower half selecting operation is regarded as a first target element, for writing into the lower half of the position of each first target element in the vector register xd. The source element in the first operand and the source element in the second operand have any one of the following data types: half-word, word, double-word and quad-word. The source element in the first operand and the source element in the second operand have the same data type; corresponding to the data type of the source element mentioned above, the data type of the target element written into the vector register xd is byte, half-word, word, or double-word. The correspondence between the data type of the source element and the data type of the target element has been described hereinbefore, and details will not be described here again.

In an implementation, when the total number of bits of the third operand is N bits, the total number of bits of the fourth operand is N bits and the third initial shift operation result is N bits, then the second shift operation result is data represented by the $(N/2)^{-th}$ bit to the $(N-1)^{-th}$ bit of the third initial shift operation result. Exemplarily, the first source register is a vector register xd; the second source register is a vector register xj; the higher half data of each element in xd is regarded as the third operand; the higher half data of each element in xj is regarded as the fourth operand; the third operand and the fourth operand can be spliced side by side to form a 2N (2N=256)-bit vector through a vector shift instruction; each element in the vector is separately performed with an arithmetic right shift and rounding and signed saturation to half width operation, the shift amount stems from the immediate; after the higher half is selected for each element contained in the third initial shift operation result, each element after the higher half selecting operation is regarded as a second target element, for writing into the higher half of the position of each second target element in the vector register xd. The source element in the third operand and the source element in the fourth operand have any one of the following data types: half-word, word, double-word and quad-word. The source element in the third operand and the source element in the fourth operand have the same data type; corresponding to the data type of the source element mentioned above, the data type of the target element written into the vector register xd is byte, half-word, word, or double-word. The correspondence between the data type of the source element and the data type of the target element has been described hereinbefore, and details will not be described here again.

Understandably, the foregoing example is an example only enumerated for the purpose of better understanding the technical solution of the embodiment of the present application and is not intended to solely limit the embodiment of the present application.

In a third specific implementation of the embodiment of the present application, the second-type vector opcode is a seventh vector opcode, the first operand is the consecutive lower half data of each element from the first source register; the second operand is the consecutive lower half data of each element from the second source register; the third operand is the consecutive higher half data of each element from the first source register; the fourth operand is the consecutive higher half data of each element from the second source register, and a specific processing manner may include the following sub-steps.

Sub-step G1: performing, according to the immediate, a logical right shift and rounding and unsigned saturation to half width operation on each element in the second splicing vector, to generate the second initial shift operation result; and performing, according to the immediate, a logical right shift and rounding and unsigned saturation to half width operation on each element in the third splicing vector, to generate the third initial shift operation result.

In the embodiment of the present application, the second-type vector opcode may be a seventh vector opcode, where the seventh vector opcode can be used to: indicate a logical right shift and rounding and unsigned saturation to half width operation on the second splicing vector, and a selecting operation on data in each element; and indicate a logical right shift and rounding and unsigned saturation to half width operation on the third splicing vector, and a selecting operation on data in each element. Each of the second splicing vector and the third splicing vector is 2N bits, where N is a positive integer greater than 0, and N is 128 bits preferably. The definitions of logical right shift, rounding, and half width are the same as those in Embodiment II, and the process of performing the logical right shift and rounding and unsigned saturation to half width operation is the same as that in Embodiment II, both of which will not be described here again.

After the second initial shift operation result and the third initial shift operation result are generated, proceed with execution of sub-step G2.

Sub-step G2: selecting, for each individual element contained in the second initial shift operation result, the consecutive lower half data thereof, and determining the selected data as the first shift operation result; and selecting, for each individual element contained in the third initial shift operation result, the consecutive higher half data thereof, and determining the selected data as the second shift operation result.

In the embodiment of the present application, at least one first target element is determined according to the data contained in the first shift operation result, and at least one second target element is determined according to the element contained in the second shift operation result.

After the first shift operation result and the second shift operation result are determined, proceed with execution of sub-step G3 and sub-step G4.

Sub-step G3: writing each first target element contained in the first shift operation result into a lower half of a position of the each first target element in the destination register.

Sub-step G4: writing each second target element contained in the second shift operation result into a higher half of a position of the each second target element in the destination register.

In an implementation, when the total number of bits of the first operand is N bits, the total number of bits of the second operand is N bits and the second initial shift operation result is N bits, then the first shift operation result is data represented by the $0^{-th}$ bit to the $(N/2-1)^{-th}$ bit of the second initial shift operation result. Exemplarily, the first source register is a vector register xd; the second source register is a vector register xj; the lower half data of each element in xd is regarded as the first operand; the lower half data of each element in xj is regarded as the second operand; the first operand and the second operand can be spliced side by side to form a 2N (2N=256)-bit vector through a vector shift instruction; each element in the vector is separately performed with a logical right shift and rounding and unsigned saturation to half width operation, the shift amount stems from the immediate; after the lower half is selected for each element contained in the second initial shift operation result, each element after the lower half selecting operation is regarded as a first target element, for sequentially writing into the lower half of the position of each first target element in the vector register xd. The source element in the first operand and the source element in the second operand have any one of the following data types: half-word, word, double-word and quad-word. The source element in the first operand and the source element in the second operand have the same data type; corresponding to the data type of the source element mentioned above, the data type of the target element written into the vector register xd is byte, half-word, word, or double-word. The correspondence between the data type of the source element and the data type of the target element has been described hereinbefore, and details will not be described here again.

In an implementation, when the total number of bits of the third operand is N bits, the total number of bits of the fourth operand is N bits and the third initial shift operation result is N bits, then the second shift operation result is data represented by the $(N/2)^{-th}$ bit to the $(N-1)^{-th}$ bit of the third initial shift operation result. Exemplarily, the first source register is a vector register xd; the second source register is a vector register xj; the higher half data of each element in xd is regarded as the third operand; the higher half data of each element in xj is regarded as the fourth operand; the third operand and the fourth operand can be spliced side by side to form a 2N (2N=256)-bit vector through a vector shift instruction; each element in the vector is separately performed with a logical right shift and rounding and unsigned saturation to half width operation, the shift amount stems from the immediate; after the higher half is selected for each element contained in the third initial shift operation result, each element after the higher half selecting operation is regarded as a second target element, for writing into the higher half of the position of each second target element in the vector register xd. The source element in the third operand and the source element in the fourth operand have any one of the following data types: half-word, word, double-word and quad-word. The source element in the third operand and the source element in the fourth operand have the same data type; corresponding to the data type of the source element mentioned above, the data type of the target element written into the vector register xd is byte, half-word, word, or double-word. The correspondence between the data type of the source element and the data type of the target element has been described hereinbefore, and details will not be described here again.

Understandably, the foregoing example is an example only enumerated for the purpose of better understanding the technical solution of the embodiment of the present application and is not intended to solely limit the embodiment of the present application.

In a fourth specific implementation of the embodiment of the present application, the second-type vector opcode is an eighth vector opcode, the first operand is the consecutive lower half data of each element from the first source register; the second operand is the consecutive lower half data of each element from the second source register; the third operand is the consecutive higher half data of each element from the first source register; the fourth operand is the consecutive higher half data of each element from the second source register, and a specific processing manner may include the following sub-steps.

Sub-step H1: performing, according to the immediate, an arithmetic right shift and rounding and unsigned saturation to half width operation on each element in the second splicing vector, to generate the second initial shift operation result; and performing, according to the immediate, an arithmetic right shift and rounding and unsigned saturation to half width operation on each element in the third splicing vector, to generate the third initial shift operation result.

In the embodiment of the present application, the second-type vector opcode may be an eighth vector opcode, where the eighth vector opcode can be used to: indicate an arithmetic right shift and rounding and unsigned saturation to half width operation on the second splicing vector, and a selecting operation on data in each element; and indicate an arithmetic right shift and rounding and unsigned saturation to half width operation on the third splicing vector, and a selecting operation on data in each element. Each of the second splicing vector and the third splicing vector is 2N bits, where N is a positive integer greater than 0, and N is 128 bits preferably. The definitions of arithmetic right shift, rounding and half width are the same as those in Embodiment II, and the process of performing the arithmetic right shift and rounding and unsigned saturation to half width operation is the same as that in Embodiment II, both of which will not be described here again.

After the second initial shift operation result and the third initial shift operation result are generated, proceed with execution of sub-step H2.

Sub-step H2: selecting, for each individual element contained in the second initial shift operation result, the consecutive lower half data thereof, and determining the selected data as the first shift operation result; and selecting, for each individual element contained in the third initial shift operation result, the consecutive higher half data thereof, and determining the selected data as the second shift operation result.

In the embodiment of the present application, at least one first target element is determined according to the data contained in the first shift operation result, and at least one second target element is determined according to the element contained in the second shift operation result.

After the first shift operation result and the second shift operation result are obtained, proceed with execution of sub-step H3 and sub-step H4.

Sub-step H3: writing each first target element contained in the first shift operation result into a lower half of a position of the each first target element in the destination register.

Sub-step H4: writing each second target element contained in the second shift operation result into a higher half of a position of the each second target element in the destination register.

In an implementation, when the total number of bits of the first operand is N bits, the total number of bits of the second operand is N bits and the second initial shift operation result is N bits, then the first shift operation result is data represented by the $0^{-th}$ bit to the $(N/2-1)^{-th}$ bit of the second initial shift operation result. Exemplarily, the first source register is a vector register xd; the second source register is a vector register xj; the lower half data of each element in xd is regarded as the first operand; the lower half data of each element in xj is regarded as the second operand; the first operand and the second operand can be spliced side by side to form a 2N (2N=256)-bit vector through a vector shift instruction; each element in the vector is separately performed with an arithmetic right shift and rounding and unsigned saturation to half width operation, the shift amount stems from the immediate; after the lower half is selected for each element contained in the second initial shift operation result, each element after the lower half selecting operation is regarded as a first target element, for writing into the lower half of the position of each first target element in the vector register xd. The source element in the first operand and the source element in the second operand have any one of the following data types: half-word, word, double-word and quad-word. The source element in the first operand and the source element in the second operand have the same data type; corresponding to the data type of the source element mentioned above, the data type of the target element written into the vector register xd is byte, half-word, word, or double-word. The correspondence between the data type of the source element and the data type of the target element has been described hereinbefore, and details will not be described here again.

In an implementation, when the total number of bits of the third operand is N bits, the total number of bits of the fourth operand is N bits and the third initial shift operation result is N bits, then the second shift operation result is data represented by the $(N/2)^{-th}$ bit to the $(N-1)^{-th}$ bit of the third initial shift operation result. Exemplarily, the first source register is a vector register xd; the second source register is a vector register xj; the higher half data of each element in xd is regarded as the third operand; the higher half data of each element in xj is regarded as the fourth operand; the third operand and the fourth operand can be spliced side by side to form a 2N (2N=256)-bit vector through a vector shift instruction; each element in the vector is separately performed with an arithmetic right shift and rounding and unsigned saturation to half width operation, the shift amount stems from the immediate; after the higher half is selected for each element contained in the third initial shift operation result, each element after the higher half selecting operation is regarded as a second target element, for writing into the higher half of the position of each second target element in the vector register xd. The source element in the third operand and the source element in the fourth operand have any one of the following data types: half-word, word, double-word and quad-word. The source element in the third operand and the source element in the fourth operand have the same data type; corresponding to the data type of the source element mentioned above, the data type of the target element written into the vector register xd is byte, half-word, word, or double-word. The correspondence between the data type of the source element and the data type of the target element has been described hereinbefore, and details will not be described here again.

Understandably, the foregoing example is an example only enumerated for the purpose of better understanding the technical solution of the embodiment of the present application and is not intended to solely limit the embodiment of the present application.

With the technical solution of the present application, a series of actions such as logical shift, rounding, signed saturation to half width are achieved for two source elements by executing an instruction containing the fifth vector opcode and the immediate; a series of actions such as arithmetic shift, rounding, signed saturation to half width are achieved for two source elements by executing an instruction containing the sixth vector opcode and the immediate; a series of actions such as logical shift, rounding, unsigned saturation to half width are achieved for two source elements by executing an instruction containing the seventh vector opcode and the immediate; a series of actions such as arithmetic shift, rounding, unsigned saturation to half width are achieved for two source elements by executing an instruction containing the eighth vector opcode and the immediate. Therefore, with the technical solution of the present disclosure, different shift requirements can be achieved through different shift parameters, and thus the use of a single shift instruction can achieve a variety of vector shift requirements, thereby effectively reducing the system overhead and improving the execution efficiency for the specific vector shift purpose.

Embodiment IV

Figure 7:
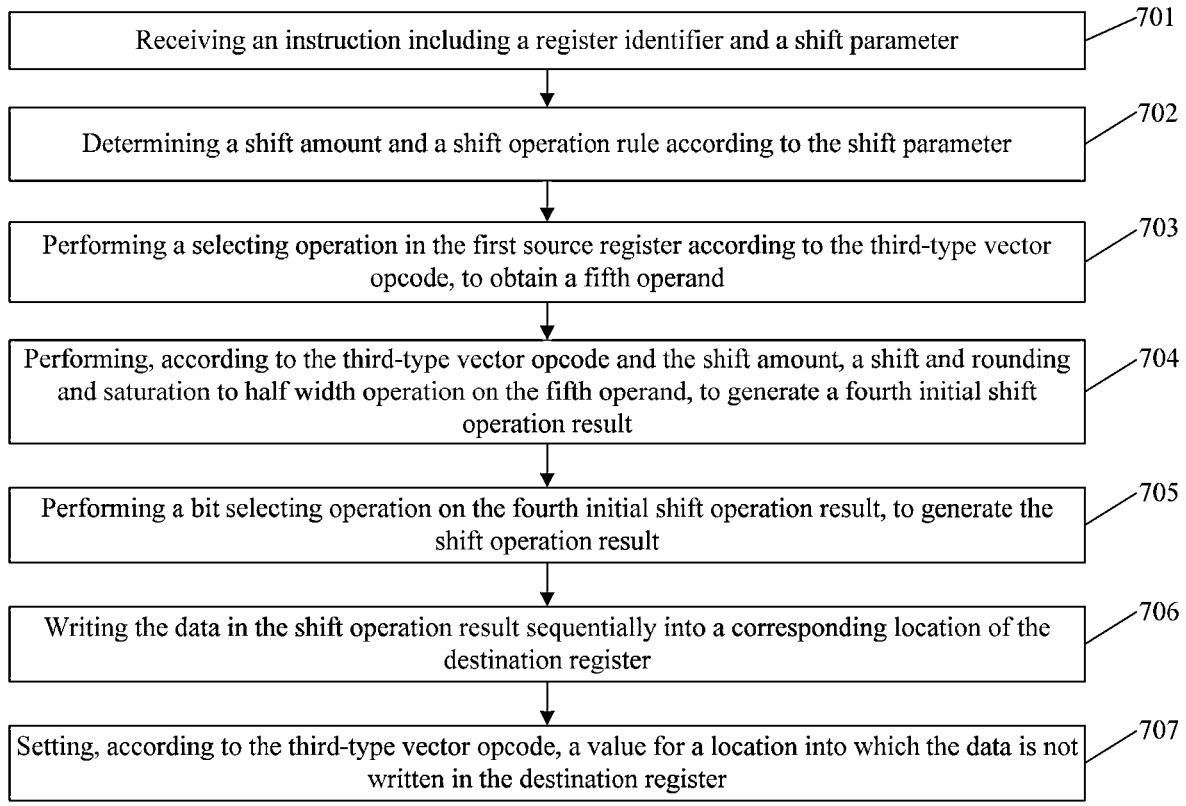
FIG. 7 is a flowchart illustrating steps of a vector shift method according to Embodiment IV of the present application.

In the embodiment of the present application, the opcode is a third-type vector opcode, and the source register is a first source register; the third-type vector opcode can be used to give an indication to perform a selecting operation in the first source register, and perform a corresponding vector shift operation. As shown in FIG. 7, a processing method of the vector shift instruction may include the following.

Step 701: receiving an instruction including a register identifier and a shift parameter.

In the embodiment of the present application, the meaning of the instruction and the parameter contained in the instruction are the same as those described in Embodiment I to Embodiment III, which will not be described herein again.

In an implementation, there is one source register in number, that is, all source elements come from a same register; there is one destination register in number; the source register is the same as or different from the destination register. Preferably, the number of bits of the first source register is 128 bits or 256 bits.

In an implementation, the received instruction is decoded to acquire the shift parameter contained in the instruction; the shift parameter is used to indicate a rule for the vector shift operation performed on the source element. In this example, the shift parameter may include parameters such as a shift amount and an opcode.

Step 702: determining a shift amount and a shift operation rule according to the shift parameter.

In the embodiment of the present application, the vector shift operation has at least one source element; the shift amount comes from a shift amount register; the shift operation rule is an opcode, and the opcode is a third-type vector opcode; and each shift amount for the element contained in the shift amount register is a positive integer greater than or equal to 0.

In an implementation, the third-type vector opcode is code represented in a binary manner, or the opcode is an identifier convertible into binary code. The instruction is formatted as "opcode destination register, source register, shift amount". When the opcode is a third-type vector opcode, in a specific implementation, the instruction is represented as "[X]VSSR$_{third\ type}$. {B.H/H.W/W.D/BU.H/HU.W/WU.D} vd/xd, vj/xj, vk$_{third\ type}$/xk$_{third\ type}$", where [X]VSSR$_{third\ type}$ is the name of instruction in the third-type vector opcode; the {B.H/H.W/W.D/BU.H/HU.W/WU.D} is a parameter for indicating a data type of a source element and a target element in the third-type vector opcode, B representing byte, H representing half-word, W representing word, and D representing double-word; vd/xd represents a destination register and a source register simultaneously, and vj/xj represents a source register; and vk$_{third\ type}$/xk$_{third\ type}$ represents a shift amount register identifier contained in the instruction when the opcode is a third-type vector opcode, where the shift amount register contains a binary array with the number of parameters contained therein being the same as the number of target elements, and the parameters contained in the data are the same or different. Exemplarily, VSSR$_{third\ type\ 1}$.B.H is a third-type vector opcode that can be converted into a binary form, for example, VSSR$_{third\ type\ 1}$.B.H is converted into 01110001000000001, a third-type vector opcode in a binary form. After the shift amount and the shift operation rule are determined according to the shift parameter, proceed with execution of step 703.

Step 703: performing a selecting operation in the first source register according to the third-type vector opcode, to obtain a fifth operand.

In the embodiment of the present application, the selecting operation includes any one of: selecting consecutive lower half data for each element in the first source register, selecting consecutive higher half data for each element in the first source register, selecting consecutive middle bit-designated data for each element in the first source register, and selecting non-consecutive bit-designated data for each element in the first source register. The data type of the source element in the fifth operand is any one of half-word, word, or double-word.

In an implementation, the first source register includes 2N bits of data, which can correspond to a plurality of half-word elements, word elements, or double-word elements; performing the selecting operation in the first source register to obtain the fifth operand includes: grouping per M-bit data in the first source register as a data group, where each data group contains at least one source element; and determining all source elements corresponding to all data groups as the fifth operand; where each of M and N is a positive integer greater than 0, and M≤N; the correspondence between source elements and data is determined based on the conversion relationship between the data type of the source element and the data bits.

In an implementation, there is no data with the same address between different data groups, or there is some data with the same address between different data groups; where the address represents location information of data from the first source register in the first source register, and the address of each data is uniquely identified in the first source register.

Preferably, N is a multiple of M. Exemplarily, N=128, M=128, the first source register includes 256 bits of data, then the data in the first source register is grouped per 128 bits, totally into two groups, (a first data group and a second data group). The first data group is data from $0^{-th}$ bit to $127^{-th}$ bit in the first source register, and the second data group is data from $128^{-th}$ bit to $255^{-th}$ bit in the first source register. There is no data with the same address between the first data group and the second data group; if the data type of the source element is half-word, the first data group contains 8 half-word source elements; if the data type of the source element is word, then the first data group contains 4 word source elements; if the data type of the source element is double-word, the first data group contains 2 double-word source elements.

After the fifth operand is obtained by performing the selecting operation for the first source register according to the third-type vector opcode, proceed with execution of step 704.

Step 704: performing, according to the third-type vector opcode and the shift amount, a shift and rounding and saturation to half width operation on the fifth operand, to generate a fourth initial shift operation result.

In the embodiment of the present application, the shift amount comes from the shift amount register, the content stored in the shift amount register may be a group of data, the group of data contains a plurality of shift values, each shift value corresponds to each source element in the fifth operand, different source elements may have the same shift value or different shift values, and the number of the shift values is the same as the number of source elements of the fifth operand; or, the number of shift values is the same as the fourth initial shift operation result.

In an implementation, when the number of shift values is the same as the number of source elements of the fifth operand, each shift value corresponds to one source element of the fifth operand, and a shift and rounding and saturation to half width operation is performed on each source element in the fifth operand according to the shift amount, to generate the fourth initial shift operation result. Exemplarily, the fifth operand includes a source element 1, a source element 2, a source element 3 and a source element 4; the shift amount register includes four shift values (a shift value 1, a shift value 2, a shift value 3 and a shift value 4); the shift amount corresponding to the source element 1 is the shift value 1, the shift amount corresponding to the source element 2 is the shift value 2, the shift amount corresponding to the source element 3 is the shift value 3, and the shift amount corresponding to the source element 4 is the shift value 4; then the source element 1 is shifted according to the shift value 1, the source element 2 is shifted according to the shift value 2, the source element 3 is shifted according to the shift value 3, and the source element 4 is shifted according to the shift value 4.

In an implementation, when the number of shift values is the same as the fourth initial shift operation result, the fifth operand is partitioned into a plurality of element groups according to the number of shift values, so that the number of element groups is the same as the number of shift values, that is, each shift value corresponds to one element group, and a shift and rounding and saturation to half width operation is performed on each source element in the fifth operand according to the shift amount corresponding to the element group where the source element is located, to generate the fourth initial shift operation result. Exemplarily, the fifth operand includes a source element 1, a source element 2, a source element 3 and a source element 4; the shift amount register includes two shift values (a shift value 1 and a shift value 2); the source element 1 and the source element 2 form a first element group, and the shift amount corresponding to the first element group is the shift value 1; the source element 3 and the source element 4 form a second element group, and the shift amount corresponding to the second element group is the shift value 2; then the source element 1 and the source element 2 are shifted according to the shift value 1, and the source element 3 and the source element 4 are shifted according to the shift value 2.

After the fourth initial shift operation result is generated, proceed with execution of step 705.

Step 705: performing a bit selecting operation on the fourth initial shift operation result, to generate the shift operation result.

In the embodiment of the present application, the bit selecting operation includes any one of: selecting consecutive lower half data for the fourth initial shift operation result, selecting consecutive higher half data for the fourth initial shift operation result, selecting consecutive middle bit-designated data for the fourth initial shift operation result, and selecting non-consecutive bit-designated data for the fourth initial shift operation result.

After the shift operation result is generated, proceed with execution of step 706.

Step 706: writing the data in the shift operation result sequentially into a corresponding location of the destination register.

In the embodiment of the present application, after the shift operation result is generated, a respective target element corresponding to each piece of data in the shift operation result can be determined, and each piece of data is sequentially written into a storage location of the respective target element in the destination register.

In an implementation, the data type of the target element is determined according to the data type of the source element; in an implementation, the number of bits corresponding to the data type of the target element is a half of the number of bits corresponding to the data type of the source element. Exemplarily, when the data type of the source element is half-word, the data type of the target element is byte; when the data type of the source element is word, the data type of the target element is half-word; when the data type of the source element is double-word, the data type of the target element is word. The source element can be signed data or unsigned data.

In an implementation, after a target element is determined, the target element is sequentially written into the destination register in a mode including: determining location information of each target element in the shift operation result, and sequentially writing the target element into the destination register at a position matching the location information corresponding to the target element, where the location information represents a sequence of the element in the shift operation result. Sequentially writing the target element into the destination register at the position matching the location information corresponding to the target element means sequentially writing the target element from high to low bits into the destination register at positions from the $(N/2-1)^{-th}$ bit to the $0^{-th}$ bit, or sequentially writing the target element from low to high bits into the destination register at positions from the $0^{-th}$ bit to the $(N/2-1)^{-th}$ bit.

After sequentially writing elements in the shift operation result into the destination register as target elements, proceed with execution of step 707.

Step 707: setting, according to the third-type vector opcode, a value for a location into which the data is not written in the destination register.

After the data in the shift operation result is sequentially written into the corresponding location of the destination register, a value for a location into which the data is not written in the destination register can be set according to the third-type vector opcode.

In conjunction with the process of acquiring the target element according to the third-type vector opcode in the embodiment of the present application, the third-type vector opcode may include a ninth vector opcode, a tenth vector opcode, an eleventh vector opcode and a twelfth vector opcode to indicate different vector shift operations respectively, and detailed description will be made specifically in combination with the following specific implementations.

In a first specific implementation of the embodiment of the present application, the third-type vector opcode is a ninth vector opcode, the fifth operand is any consecutive source element from the first source register, and a specific processing method may include the following sub-steps.

Sub-step K1: performing, according to the shift amount, a logical right shift and rounding and signed saturation to half width operation on the fifth operand, to generate the fourth initial shift operation result.

In the embodiment of the present application, after the ninth vector opcode is obtained, each element contained in the fifth operand may be performed with a logical right shift and rounding and signed saturation to half width operation according to the shift amount, to generate the fourth initial shift operation result, where the shift amount comes from the shift amount register.

In an implementation, the first source register includes 2N bits of data, which can correspond to a plurality of half-word elements, word elements, or double-word elements; performing the selecting operation in the first source register to obtain the fifth operand includes: grouping per M-bit data in the first source register as a data group; and determining all source elements corresponding to each data group as the fifth operand. The performing, according to the shift amount, the logical right shift and rounding and signed saturation to half width operation on each element contained in the fifth operand, to generate the fourth initial shift operation result includes: determining a shift value in the shift amount register corresponding to each source element in the fifth operand, and performing, according to the shift value corresponding to each source element, the logical right shift and rounding and signed saturation to half width operation on each source element, to obtain the fourth initial shift operation result.

Further, the definitions of logical right shift, rounding, half width, and signed saturation are the same as those in Embodiment II; the process of performing the logical right shift and rounding and signed saturation to half width operation is the same as that in Embodiment II, and details will not be described here again.

After the fourth initial shift operation result is generated, proceed with execution of sub-step K2.

Sub-step K2: selecting, for each individual element contained in the fourth initial shift operation result, the consecutive lower half data thereof, and determining the element after the selecting operation as the shift operation result.

In the embodiment of the present application, after the fourth initial shift operation result is generated, the consecutive lower half data of each element in the fourth initial shift operation result can be selected separately, and the consecutive lower half data of each element after the selecting operation can be determined as the shift operation result.

After the shift operation result is obtained, proceed with execution of sub-step K3.

Sub-step K3: partitioning a storage location of the destination register according to a preset value, to generate a plurality of storage areas.

In the embodiment of the present application, the preset value refers to a value used for partitioning the storage location within the vector register, and the preset value is a bit width of data occupied by the target element. A specific value of the preset value can be determined according to service requirements, which is not limited in the embodiment of the present application. Preferably, the preset value is a value based on which each partitioned storage area is of the same size (the data stored in each storage area has the same bit width).

After the plurality of storage areas are generated, proceed with execution of sub-step K4.

Sub-step K4: writing the data in the shift operation result sequentially into a lower half of each storage area.

In the embodiment of the present application, when the fifth operand is M bits, the fourth initial shift operation result is M/2 bits, then the shift operation result is data represented by the $0^{-th}$ bit to the $(M/4-1)^{-th}$ bit of the fourth initial shift operation result. Exemplarily, the first source register is a vector register xj; the first source register is 2M; corresponding source elements per M bits in xj are regarded as the fifth operand; through a vector shift instruction, each source element per M bits contained in the fifth operand may be performed with a logical right shift and rounding and signed saturation to half width operation, to obtain the fourth initial shift operation result; the shift amount comes from the shift amount register; the lower half is selected, for each element in the fourth initial shift operation result, as the lower half of each target element for sequentially writing into the lower half of the target element in the vector register xd per M bits, and the higher half data of each target element per M bits is set to 0. The source element in the fifth operand has any one of the following data types: half-word, word and double-word; corresponding to the data type of the source element mentioned above, the data type of the target element written into the vector register xd is byte, half-word or word. The correspondence between the data type of the source element and the data type of the target element has been described hereinbefore, and details will not be described here again.

After the data in the shift operation result is sequentially written into the lower half of each storage area, proceed with execution of sub-step K5.

Sub-step K5: setting a value for a location into which the data is not written in each storage area to be zero.

In the embodiment of the present application, after the element(s) in the shift operation result is (are) taken as the target element(s) for sequentially writing into the lower half of each storage area, a value for a location into which the target element is not written in each storage area can be set to zero separately.

Exemplarily, the first source register is vj/xj, and the third-type vector opcode is the ninth vector opcode, then executing the vector shift instruction is performing, for each source element in the first source register vj/xj per 128 bits, the logical right shift and rounding and signed saturation to half width operation, and the lower half of each element in the shift result is sequentially written into the lower half of each target element in the destination register vd/xd per 128 bits, and the higher half of each target element in the destination register per 128 bits is set to 0; the shift amount of each element comes from the shift amount register vk/xk, and the source element has any one of the following data types: half-word, word and double-word.

Understandably, the foregoing example is an example only enumerated for the purpose of better understanding the technical solution of the embodiment of the present application and is not intended to solely limit the embodiment of the present application.

In a second specific implementation of the embodiment of the present application, the third-type vector opcode is a tenth vector opcode, the fifth operand is any consecutive source element from the first source register, and a specific processing manner may include the following sub-steps.

Sub-step M1: performing, according to the shift amount, an arithmetic right shift and rounding and signed saturation to half width operation on the fifth operand, to generate the fourth initial shift operation result.

In the embodiment of the present application, after the tenth vector opcode is obtained, each element contained in the fifth operand may be performed with an arithmetic right shift and rounding and signed saturation to half width operation according to the shift amount, to generate the fourth initial shift operation result, where the shift amount comes from the shift amount register.

In an implementation, the first source register includes 2N bits of data, which can correspond to a plurality of half-word elements, word elements, or double-word elements; performing the selecting operation in the first source register to obtain the fifth operand includes: grouping per M-bit data in the first source register as a data group; and determining all source elements corresponding to each data group as the fifth operand. The performing, according to the shift amount, the arithmetic right shift and rounding and signed saturation to half width operation on each element contained in the fifth operand, to generate the fourth initial shift operation result includes: determining a shift value in the shift amount register corresponding to each source element in the fifth operand, and performing, according to the shift value corresponding to each source element, the arithmetic right shift and rounding and signed saturation to half width operation on each source element, to obtain the fourth initial shift operation result.

Further, the definitions of arithmetic right shift, rounding, half width, and signed saturation are the same as those in Embodiment II; the process of performing the arithmetic right shift and rounding and signed saturation to half width operation is the same as that in Embodiment II, and details will not be described here again.

After the fourth initial shift operation result is generated, proceed with execution of sub-step M2.

Sub-step M2: selecting, for each individual element contained in the fourth initial shift operation result, the consecutive lower half data thereof, and determining the element after the selecting operation as the shift operation result.

In the embodiment of the present application, after the fourth initial shift operation result is generated, the consecutive lower half data of each element in the fourth initial shift operation result can be selected separately, and the consecutive lower half data of each element after the selecting operation can be determined as the shift operation result.

After the shift operation result is obtained, proceed with execution of sub-step M3.

Sub-step M3: partitioning a storage location of the destination register according to a preset value, to generate a plurality of storage areas.

In the embodiment of the present application, the preset value refers to a value used for area partitioning of the storage location within the destination register, and the preset value is a bit width of data occupied by the target element. A specific value of the preset value can be determined according to service requirements, which is not limited in the embodiment of the present application. Preferably, the preset value is a value based on which each partitioned storage area is of the same size (the data stored in each storage area has the same bit width).

After the plurality of storage areas are generated by partitioning the storage location in the destination register according to the preset value, proceed with execution of sub-step M4.

Sub-step M4: writing the data in the shift operation result sequentially into a lower half of each storage area.

In the embodiment of the present application, after the plurality of storage areas are generated and the shift operation result is obtained, the element(s) in the shift operation result can be taken as the target element(s) for sequentially writing into the lower half of each storage area.

In an implementation, when the fifth operand is M bits, the fourth initial shift operation result is M/2 bits, then the shift operation result is data represented by the $0^{-th}$ bit to the $(M/4-1)^{-th}$ bit of the fourth initial shift operation result. Exemplarily, the first source register is a vector register xj; the first source register is 2M; corresponding source elements per M bits in xj are regarded as the fifth operand; through a vector shift instruction, each element per M bits contained in the fifth operand may be performed with an arithmetic right shift and rounding and signed saturation to half width operation, to obtain the fourth initial shift operation result; the shift amount comes from the shift amount register; the lower half is selected, for each element in the fourth initial shift operation result, as each target element for sequentially writing into the lower half of each target element in the vector register xd per M bits, and the higher half data of each target element per M bits is set to 0. The source element in the fifth operand has any one of the following data types: half-word, word and double-word; corresponding to the data type of the source element mentioned above, the data type of the target element written into the vector register xd is byte, half-word or word. The correspondence between the data type of the source element and the data type of the target element has been described hereinbefore, and details will not be described here again.

After the data in the shift operation result is sequentially written into the lower half of each storage area, proceed with execution of sub-step M5.

Sub-step M5: setting a value for a location into which the data is not written in each storage area to be zero.

In the embodiment of the present application, after the element(s) in the shift operation result is (are) taken as the target element(s) for sequentially writing into the lower half of each storage area, a value for a location into which the target element is not written in each storage area can be set to 0 separately.

Exemplarily, the first source register is vj/xj, and the third-type vector opcode is the tenth vector opcode, then executing the vector shift instruction is performing, for each source element in the first source register vj/xj per 128 bits, the arithmetic right shift and rounding and signed saturation to half width operation, and the lower half of each element in the shift result is sequentially written into the lower half of each target element in the destination register vd/xd per 128 bits, and the higher half of each target element in the destination register per 128 bits is set to 0; the shift amount of each element comes from the shift amount register vk/xk, and the source element has any one of the following data types: half-word, word and double-word.

Understandably, the foregoing example is an example only enumerated for the purpose of better understanding the technical solution of the embodiment of the present application and is not intended to solely limit the embodiment of the present application.

In a third specific implementation of the embodiment of the present application, the third-type vector opcode is an eleventh vector opcode, the fifth operand is any consecutive source element from the first source register, and a specific processing manner may include the following sub-steps.

Sub-step N1: performing, according to the shift amount, a logical right shift and rounding and unsigned saturation to half width operation on the fifth operand, to generate the fourth initial shift operation result.

In the embodiment of the present application, after the eleventh vector opcode is obtained, each element contained in the fifth operand may be performed with a logical right shift and rounding and unsigned saturation to half width operation according to the shift amount, to generate the fourth initial shift operation result, where the shift amount comes from the shift amount register.

In an implementation, the first source register includes 2N bits of data, which can correspond to a plurality of half-word elements, word elements, or double-word elements; performing the selecting operation in the first source register to obtain the fifth operand includes: grouping per M-bit data in the first source register as a data group; and determining all source elements corresponding to each data group as the fifth operand. The performing, according to the shift amount, the logical right shift and rounding and unsigned saturation to half width operation on each element contained in the fifth operand, to generate the fourth initial shift operation result includes: determining a shift value in the shift amount register corresponding to each source element in the fifth operand, and performing, according to the shift value corresponding to each source element, the logical right shift and rounding and unsigned saturation to half width operation on each source element, to obtain the fourth initial shift operation result.

Further, the definitions of logical right shift, rounding and half width are the same as those in Embodiment II; the process of performing the logical right shift and rounding and unsigned saturation to half width operation is the same as that in Embodiment II, and details will not be described here again.

After the fourth initial shift operation result is generated by performing the logical right shift and rounding and unsigned saturation to half width operation on the fifth operand according to the shift amount, proceed with execution of sub-step N2.

Sub-step N2: selecting, for each individual element contained in the fourth initial shift operation result, the consecutive lower half data thereof, and determining the element after the selecting operation as the shift operation result.

In the embodiment of the present application, after the fourth initial shift operation result is generated, the consecutive lower half data of each element in the fourth initial shift operation result can be selected separately, and the consecutive lower half data of each selected element can be determined as the shift operation result.

After the shift operation result is obtained, proceed with execution of sub-step N3.

Sub-step N3: partitioning a storage location of the destination register according to a preset value, to generate a plurality of storage areas.

In the embodiment of the present application, the preset value refers to a value used for area partitioning of the storage location within the destination register, and the preset value is a bit width of data occupied by the target element. A specific value of the preset value can be determined according to service requirements, which is not limited in the embodiment of the present application. Preferably, the preset value is a value based on which each partitioned storage area is of the same size (the data stored in each storage area has the same bit width).

After the plurality of storage areas are generated, proceed with execution of sub-step N4.

Sub-step N4: writing the data in the shift operation result sequentially into a lower half of each storage area.

In the embodiment of the present application, after the plurality of storage areas are generated and the shift operation result is obtained, the element(s) in the shift operation result can be taken as the target element(s) for sequentially writing into the lower half of each storage area.

In an implementation, when the fifth operand is M bits, the fourth initial shift operation result is M/2 bits, then the shift operation result is data represented by the $0^{-th}$ bit to the $(M/4-1)^{-th}$ bit of the fourth initial shift operation result. Exemplarily, the first source register is a vector register xj; the first source register is 2M; corresponding source elements per M bits in xj are regarded as the fifth operand; through a vector shift instruction, each element per M bits contained in the fifth operand may be performed with a logical right shift and rounding and unsigned saturation to half width operation, to obtain the fourth initial shift operation result; the shift amount comes from the shift amount register; the lower half is selected, for each element in the fourth initial shift operation result, as each target element for sequentially writing into the lower half of each target element in the vector register xd per M bits, and the higher half data of each target element per M bits is set to 0. The source element in the fifth operand has any one of the following data types: half-word, word and double-word; corresponding to the data type of the source element mentioned above, the data type of the target element written into the vector register xd is byte, half-word or word. The correspondence between the data type of the source element and the data type of the target element has been described hereinbefore, and details will not be described here again.

After the data in the shift operation result is sequentially written into the lower half of each storage area, proceed with execution of sub-step N5.

Sub-step N5: setting a value for a location into which the data is not written in each storage area to be zero.

After the element(s) in the shift operation result is (are) taken as the target element(s) for sequentially writing into the lower half of each storage area, a value for a location into which the target element is not written in each storage area can be set to zero separately.

Exemplarily, the first source register is vj/xj, and the third-type vector opcode is the eleventh vector opcode, then executing the vector shift instruction is performing, for each source element in the first source register vj/xj per 128 bits, the logical right shift and rounding and unsigned saturation to half width operation, and the lower half of each element in the shift result is sequentially written into the lower half of each target element in the destination register vd/xd per 128 bits, and the higher half of each target element in the destination register per 128 bits is set to 0; the shift amount of each element comes from the shift amount register vk/xk, and the source element has any one of the following data types: half-word, word and double-word.

Understandably, the foregoing example is an example only enumerated for the purpose of better understanding the technical solution of the embodiment of the present application and is not intended to solely limit the embodiment of the present application.

In a fourth specific implementation of the present application, the third-type vector opcode is a twelfth vector opcode, the fifth operand is any consecutive source element from the first source register, and a specific processing manner may include the following sub-steps.

Sub-step S1: performing, according to the shift amount, an arithmetic right shift and rounding and unsigned saturation to half width operation on the fifth operand, to generate the fourth initial shift operation result.

In the embodiment of the present application, after the twelfth vector opcode is obtained, each element contained in the fifth operand may be performed with an arithmetic right shift and rounding and unsigned saturation to half width operation according to the shift amount, to generate the fourth initial shift operation result, where the shift amount comes from the shift amount register.

After the fourth initial shift operation result is generated, proceed with execution of sub-step S2.

Sub-step S2: selecting, for each individual element contained in the fourth initial shift operation result, the consecutive lower half data thereof, and determining the element after the selecting operation as the shift operation result.

In the embodiment of the present application, after the fourth initial shift operation result is generated, the consecutive lower half data of each element in the fourth initial shift operation result can be selected separately, and the consecutive lower half data of each selected element can be determined as the shift operation result.

In an implementation, the first source register includes 2N bits of data, which can correspond to a plurality of half-word elements, word elements, or double-word elements; performing the selecting operation in the first source register to obtain the fifth operand includes: grouping per M-bit data in the first source register as a data group; and determining all source elements corresponding to each data group as the fifth operand. The performing, according to the shift amount, the arithmetic right shift and rounding and unsigned saturation to half width operation on the fifth operand, to generate the fourth initial shift operation result includes: determining a shift value in the shift amount register corresponding to each source element in the fifth operand, and performing, according to the shift value corresponding to each source element, the arithmetic right shift and rounding and unsigned saturation to half width operation on each source element, to obtain the fourth initial shift operation result.

Further, the definitions of arithmetic right shift, rounding, half width, and unsigned saturation are the same as those in Embodiment II; the process of performing the arithmetic right shift and rounding and unsigned saturation to half width operation is the same as that in Embodiment II, and details will not be described here again.

After the shift operation result is obtained, proceed with execution of sub-step S3.

Sub-step S3: partitioning a storage location of the destination register according to a preset value, to generate a plurality of storage areas.

In the embodiment of the present application, the preset value refers to a value used for area partitioning of the storage location within the destination register, and the preset value is a bit width of data occupied by the target element. A specific value of the preset value can be determined according to service requirements, which is not limited in the embodiment of the present application. Preferably, the preset value is a value based on which each partitioned storage area is of the same size (the data stored in each storage area has the same bit width).

After the plurality of storage areas are generated, proceed with execution of sub-step S4.

Sub-step S4: writing the data in the shift operation result sequentially into a lower half of each storage area.

In the embodiment of the present application, after the plurality of storage areas are generated and the shift operation result is obtained, the element(s) in the shift operation result can be taken as the target element(s) for sequentially writing into the lower half of each storage area.

In an implementation, when the fifth operand is M bits, the fourth initial shift operation result is M/2 bits, then the shift operation result is data represented by the $0^{-th}$ bit to the $(M/4-1)^{-th}$ bit of the fourth initial shift operation result. Exemplarily, the first source register is a vector register xj; the first source register is 2M; corresponding source elements per M bits in xj are regarded as the fifth operand; through a vector shift instruction, each element per M bits contained in the fifth operand may be performed with an arithmetic right shift and rounding and unsigned saturation to half width operation, to obtain the fourth initial shift operation result; the shift amount comes from the shift amount register; the lower half is selected, for each element in the fourth initial shift operation result, as each target element for sequentially writing into the lower half of each target element in the vector register xd per M bits, and the higher half data of each target element per M bits is set to 0. The source element in the fifth operand has any one of the following data types: half-word, word and double-word; corresponding to the data type of the source element mentioned above, the data type of the target element written into the vector register xd is byte, half-word or word. The correspondence between the data type of the source element and the data type of the target element has been described hereinbefore, and details will not be described here again.

After the data in the shift operation result is sequentially written into the lower half of each storage area, proceed with execution of sub-step S5.

Sub-step S5: setting a value for a location into which the data is not written in each storage area to be zero.

After the element(s) in the shift operation result is (are) taken as the target element(s) for sequentially writing into the lower half of each storage area, a value for a location into which the target element is not written in each storage area can be set to 0 separately.

Understandably, the foregoing example is an example only enumerated for the purpose of better understanding the technical solution of the embodiment of the present application and is not intended to solely limit the embodiment of the present application.

With the technical solution of the present application, a series of actions such as logical shift, rounding, signed saturation to half width are achieved for two source elements by executing an instruction containing the ninth vector opcode and the shift amount; a series of actions such as arithmetic shift, rounding, signed saturation to half width are achieved for two source elements by executing an instruction containing the tenth vector opcode and the shift amount, where the shift amount comes from the register; a series of actions such as logical shift, rounding, unsigned saturation to half width are achieved for two source elements by executing an instruction containing the eleventh vector opcode and the shift amount; a series of actions such as arithmetic shift, rounding, unsigned saturation to half width are achieved for two source elements by executing an instruction containing the twelfth vector opcode and the shift amount. Therefore, with the technical solution of the present disclosure, different shift requirements can be achieved through different shift parameters, and thus the use of a single shift instruction can achieve a variety of vector shift requirements, thereby effectively reducing the system overhead and improving the execution efficiency for the specific vector shift purpose.

Embodiment V

Figure 8:
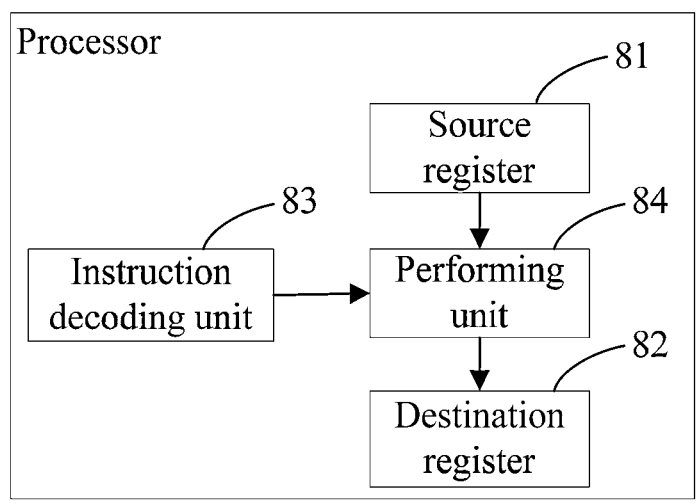
FIG. 8 is a structural block diagram of a processor according to Embodiment V of the present application.

Reference is made to FIG. 8, which shows a structural block diagram of a processor according to Embodiment V of the present application.

As shown in FIG. 8, the processor can include:

a plurality of vector registers including a source register 81 and a destination register 82, where the source register is configured to store a source element to be operated in a vector shift operation;

an instruction decoding unit 83 configured to decode a vector shift instruction, where the vector shift instruction includes a register identifier and a shift parameter, the register identifier includes a source register identifier representing the source register 81 and a destination register identifier representing the destination register 82; and a performing unit 84 configured to perform, in response to the vector shift instruction and according to the shift parameter, the vector shift operation on the source element acquired from the source register 81, and acquire a target element produced from the vector shift operation, and write the target element into the destination register 82.

Preferably, the performing unit 84 is configured to: determine a shift amount and a shift operation rule according to the shift parameter, where the vector shift operation has at least one source element; and perform, according to the shift amount and the shift operation rule, a corresponding shift operation on the source element from the source register, to generate a shift operation result; and determine an element in the shift operation result as the target element.

Preferably, the shift parameter includes a shift amount and an opcode; the shift amount is used to indicate a number of bits by which the source element is to be shifted in the vector shift operation; the opcode is used to represent a shift operation rule for the source element from the source register and the target element from the destination register;
the performing unit 84 is configured to: select from the source register, according to the opcode, the source element for performing the vector shift operation, and determine the selected source element as an operand; perform the corresponding shift operation on the operand according to the opcode, to generate the shift operation result; determine, according to the opcode, a storage mode of the target element into the destination register; and store, according to the storage mode, the target element into the destination register.

Preferably, the shift amount is an immediate; the source register includes a first source register and a second source register.

Preferably, the opcode is a first-type vector opcode; the performing unit 84 is configured to:
determine, according to the first-type vector opcode, all source elements from the first source register as an operand and all source elements from the second source register as an operand;
splice the operand from the first source register and the operand from the second source register according to the first-type vector opcode, and then generate a first splicing vector;
perform, according to the immediate, a shift and rounding and saturation to half width operation on each source element in the first splicing vector, to generate a first initial shift operation result; and
perform a bit selecting operation on the first initial shift operation result, to generate the shift operation result, where the bit selecting operation includes any one of: selecting consecutive lower half data for each element contained in the first initial shift operation result, selecting consecutive higher half data for each element contained in the first initial shift operation result, selecting consecutive middle bit-designated data for each element contained in the first initial shift operation result, and selecting non-consecutive bit-designated data for each element contained in the first initial shift operation result.

Preferably, the first-type vector opcode is a first vector opcode; the performing unit 84 is configured to:
perform, according to the immediate, a logical right shift and rounding and signed saturation to half width operation on each source element in the first splicing vector, to generate the first initial shift operation result; and
select, for each individual element contained in the first initial shift operation result, the consecutive lower half data thereof, and determine the element after the selecting operation as the shift operation result.

Preferably, the first-type vector opcode is a second vector opcode; the performing unit 84 is configured to:
perform, according to the immediate, an arithmetic right shift and rounding and signed saturation to half width operation on each source element in the first splicing vector, to generate the first initial shift operation result; and
select, for each individual element contained in the first initial shift operation result, the consecutive lower half data thereof, and determine the element after the selecting operation as the shift operation result.

Preferably, the first-type vector opcode is a third vector opcode; the performing unit 84 is configured to:
perform, according to the immediate, a logical right shift and rounding and unsigned saturation to half width operation on each source element in the first splicing vector, to generate the first initial shift operation result; and
select, for each individual element contained in the first initial shift operation result, the consecutive lower half data thereof, and determine the element after the selecting operation as the shift operation result.

Preferably, the first-type vector opcode is a fourth vector opcode; the performing unit 84 is configured to:
perform, according to the immediate, an arithmetic right shift and rounding and unsigned saturation to half width operation on each source element in the first splicing vector, to generate the first initial shift operation result; and
select, for each individual element contained in the first initial shift operation result, the consecutive lower half data thereof, and determine the element after the selecting operation as the shift operation result.

Preferably, the opcode is a second-type vector opcode; the performing unit 84 is configured to:
perform, according to the second-type vector opcode, a selecting operation in the first source register and the second source register respectively, to obtain a first operand and a second operand; where the selecting operation includes any one of: selecting consecutive lower half data for each element in the first source register and the second source register, selecting consecutive higher half data for each element in the first source register and the second source register, selecting consecutive middle bit-designated data for each element in the first source register and the second source register, and selecting non-consecutive bit-designated data for each element in the first source register and the second source register;
determine data in the first source register other than the first operand as a third operand, and determine data in the second source register other than the second operand as a fourth operand;
splice the first operand and the second operand, and then generate a second splicing vector; and splice the third operand and the fourth operand, and then generate a third splicing vector; where an element contained in each of the second splicing vector and the third splicing vector has any one of the following data types: half-word, word, double-word and quad-word;
perform, according to the immediate, a shift and rounding and saturation to half width operation on each element in the second splicing vector, to generate a second initial shift operation result; and perform, according to the immediate, a shift and rounding and saturation to half width operation on each element in the third splicing vector, to generate a third initial shift operation result;
perform a bit selecting operation on the second initial shift operation result, to generate a first shift operation result, and perform a bit selecting operation on the third initial shift operation result, to generate a second shift operation result; where the performing the bit selecting operation includes any one of: selecting consecutive lower half data for each element contained in the second initial shift operation result and each element contained in the third initial shift operation result, selecting consecutive higher half data for each element contained in the second initial shift operation result and each element contained in the third initial shift operation result, selecting consecutive middle bit-designated data for each element contained in the second initial shift operation result and each element contained in the third initial shift operation result, and selecting non-consecutive bit-designated data for each element contained in the second initial shift operation result and each element contained in the third initial shift operation result;

write the first shift operation result into a corresponding storage location of the destination register according to a bit selecting operation location of the first shift operation result; and write the second shift operation result into a corresponding storage location of the destination register according to a bit selecting operation location of the second shift operation result.

Preferably, the second-type vector opcode is a fifth vector opcode; the first operand is data composed of a consecutive lower half of each element from the first source register; the second operand is data composed of a consecutive lower half of each element from the second source register; the third operand is data composed of a consecutive higher half of each element from the first source register; and the fourth operand is data composed of a consecutive higher half of each element from the second source register; the performing unit 84 is configured to:

perform, according to the immediate, a logical right shift and rounding and signed saturation to half width operation on each element in the second splicing vector, to generate the second initial shift operation result; and perform, according to the immediate, a logical right shift and rounding and signed saturation to half width operation on each element in the third splicing vector, to generate the third initial shift operation result;

select, for each individual element contained in the second initial shift operation result, the consecutive lower half data thereof, and determine the selected data as the first shift operation result; and select, for each individual element contained in the third initial shift operation result, the consecutive higher half data thereof, and determine the selected data as the second shift operation result; where at least one first target element is determined according to the data contained in the first shift operation result, and at least one second target element is determined according to the data contained in the second shift operation result;

write each first target element contained in the first shift operation result into a lower half of a position of the each first target element in the destination register; and write each second target element contained in the second shift operation result into a higher half of a position of the each second target element in the destination register.

Preferably, the second-type vector opcode is a sixth vector opcode; the first operand is data composed of a consecutive lower half of each element from the first source register; the second operand is data composed of a consecutive lower half of each element from the second source register; the third operand is data composed of a consecutive higher half of each element from the first source register; and the fourth operand is data composed of a consecutive higher half of each element from the second source register; the performing unit is configured to:

perform, according to the immediate, an arithmetic right shift and rounding and signed saturation to half width operation on each element in the second splicing vector, to generate the second initial shift operation result; and perform, according to the immediate, an arithmetic right shift and rounding and signed saturation to half width operation on each element in the third splicing vector, to generate the third initial shift operation result;

select, for each individual element contained in the second initial shift operation result, the consecutive lower half data thereof, and determine the selected data as the first shift operation result; and select, for each individual element contained in the third initial shift operation result, the consecutive higher half data thereof, and determine the selected data as the second shift operation result; where at least one first target element is determined according to the data contained in the first shift operation result, and at least one second target element is determined according to the data contained in the second shift operation result;

write each first target element contained in the first shift operation result into a lower half of a position of the each first target element in the destination register; and write each second target element contained in the second shift operation result into a higher half of a position of the each second target element in the destination register.

Preferably, the second-type vector opcode is a seventh vector opcode; the first operand is data composed of a consecutive lower half of each element from the first source register; the second operand is data composed of a consecutive lower half of each element from the second source register; the third operand is data composed of a consecutive higher half of each element from the first source register; and the fourth operand is data composed of a consecutive higher half of each element from the second source register; the performing unit 84 is configured to:

perform, according to the immediate, a logical right shift and rounding and unsigned saturation to half width operation on each element in the second splicing vector, to generate the second initial shift operation result;

perform, according to the immediate, a logical right shift and rounding and unsigned saturation to half width operation on each element in the third splicing vector, to generate the third initial shift operation result;

select, for each individual element contained in the second initial shift operation result, the consecutive lower half data thereof, and determine the selected data as the first shift operation result; and select, for each individual element contained in the third initial shift operation result, the consecutive higher half data thereof, and determine the selected data as the second shift operation result; where at least one first target element is determined according to the data contained in the first shift operation result, and at least one second target element is determined according to the data contained in the second shift operation result;

write each first target element contained in the first shift operation result into a lower half of a position of the each first target element in the destination register;

write each second target element contained in the second shift operation result into a higher half of a position of the each second target element in the destination register.

Preferably, the second-type vector opcode is an eighth vector opcode; the first operand is data composed of a consecutive lower half of each element from the first source register; the second operand is data composed of a consecutive lower half of each element from the second source register; the third operand is data composed of a consecutive higher half of each element from the first source register; and the fourth operand is data composed of a consecutive higher half of each element from the second source register; the performing unit 84 is configured to:

perform, according to the immediate, an arithmetic right shift and rounding and unsigned saturation to half width operation on each element in the second splicing vector, to generate the second initial shift operation result;

perform, according to the immediate, an arithmetic right shift and rounding and unsigned saturation to half width operation on each element in the third splicing vector, to generate the third initial shift operation result;

select, for each individual element contained in the second initial shift operation result, the consecutive lower half data thereof, and determine the selected data as the first shift operation result; and select, for each individual element contained in the third initial shift operation result, the consecutive higher half data thereof, and determine the selected data as the second shift operation result; where at least one first target element is determined according to the data contained in the first shift operation result, and at least one second target element is determined according to the data contained in the second shift operation result;

write each first target element contained in the first shift operation result into a lower half of a position of the each first target element in the destination register; and write each second target element contained in the second shift operation result into a higher half of a position of the each second target element in the destination register.

Preferably, the instruction further includes a shift amount register identifier, the shift amount register identifier is used to represent a shift amount register, and the shift amount register is a register for storing the shift amount.

Preferably, the opcode is a third-type vector opcode; the source register includes a first source register; the performing unit is configured to:

perform a selecting operation in the first source register according to the third-type vector opcode, to obtain a fifth operand; where the selecting operation includes any one of: selecting consecutive lower half data for each element in the first source register, selecting consecutive higher half data for each element in the first source register, selecting consecutive middle bit-designated data for each element in the first source register, and selecting non-consecutive bit-designated data for each element in the first source register;

perform, according to the third-type vector opcode and the shift amount, a shift and rounding and saturation to half width operation on the fifth operand, to generate a fourth initial shift operation result;

perform a bit selecting operation on the fourth initial shift operation result, to generate the shift operation result; where the bit selecting operation includes any one of: selecting consecutive lower half data for each element contained in the fourth initial shift operation result, selecting consecutive higher half data for each element contained in the fourth initial shift operation result, selecting consecutive middle bit-designated data for each element contained in the fourth initial shift operation result, and selecting non-consecutive bit-designated data for each element contained in the fourth initial shift operation result;

write the data in the shift operation result sequentially into a corresponding location of the destination register; and set, according to the third-type vector opcode, a value for a location into which the data is not written in the destination register.

Preferably, the third-type vector opcode is a ninth vector opcode, and the fifth operand is any consecutive source element from the first source register; the performing unit 84 is configured to:

perform, according to the shift amount, a logical right shift and rounding and signed saturation to half width operation on each element contained in the fifth operand, to generate the fourth initial shift operation result;

select, for each individual element contained in the fourth initial shift operation result, the consecutive lower half data thereof, and determine the element after the selecting operation as the shift operation result;

partition a storage location of the destination register according to a preset value, and determine a storage area of each target element;

write the data in the shift operation result sequentially into a lower half of each storage area; and set a value for a location into which the data is not written in each storage area to be zero.

Preferably, the third-type vector opcode is a tenth vector opcode, and the fifth operand is any consecutive source element from the first source register; the performing unit 84 is configured to:

perform, according to the shift amount, an arithmetic right shift and rounding and signed saturation to half width operation on each element contained in the fifth operand, to generate the fourth initial shift operation result;

select, for each individual element contained in the fourth initial shift operation result, the consecutive lower half data thereof, and determine the element after the selecting operation as the shift operation result;

partition a storage location of the destination register according to a preset value, and determine a storage area of each target element;

write the data in the shift operation result sequentially into a lower half of each storage area; and set a value for a location into which the data is not written in each storage area to be zero.

Preferably, the third-type vector opcode is an eleventh vector opcode, and the fifth operand is any consecutive source element from the first source register; the performing unit 84 is configured to:

perform, according to the shift amount, a logical right shift and rounding and unsigned saturation to half width operation on each element contained in the fifth operand, to generate the fourth initial shift operation result;

select, for each individual element contained in the fourth initial shift operation result, the consecutive lower half data thereof, and determine the element after the selecting operation as the shift operation result;

partition a storage location of the destination register according to a preset value, and determine a storage area of each target element;

write the data in the shift operation result sequentially into a lower half of each storage area; and set a value for a location into which the data is not written in each storage area to be zero.

Preferably, the third-type vector opcode is a twelfth vector opcode, and the fifth operand is any consecutive source element from the first source register; the performing unit 84 is configured to:
- perform, according to the shift amount, an arithmetic right shift and rounding and unsigned saturation to half width operation on each element contained in the fifth operand, to generate the fourth initial shift operation result;
- select, for each individual element contained in the fourth initial shift operation result, the consecutive lower half data thereof, and determine the element after the selecting operation as the shift operation result;
- partition a storage location of the destination register according to a preset value, and determine a storage area of each target element;
- write the data in the shift operation result sequentially into a lower half of each storage area; and
- set a value for a location into which the data is not written in each storage area to be zero.

Preferably, there are singular or plural source registers in number, there is a singular destination register in number, and the source register identifier is the same as or different from the destination register identifier.

Preferably, there are plural source registers in number, and there is a singular destination register in number;
- each of all the source registers has a source register identifier different from the destination register identifier, or one of all the source registers has a source register identifier that is the same as the destination register identifier.

Embodiment VI

Figure 9:
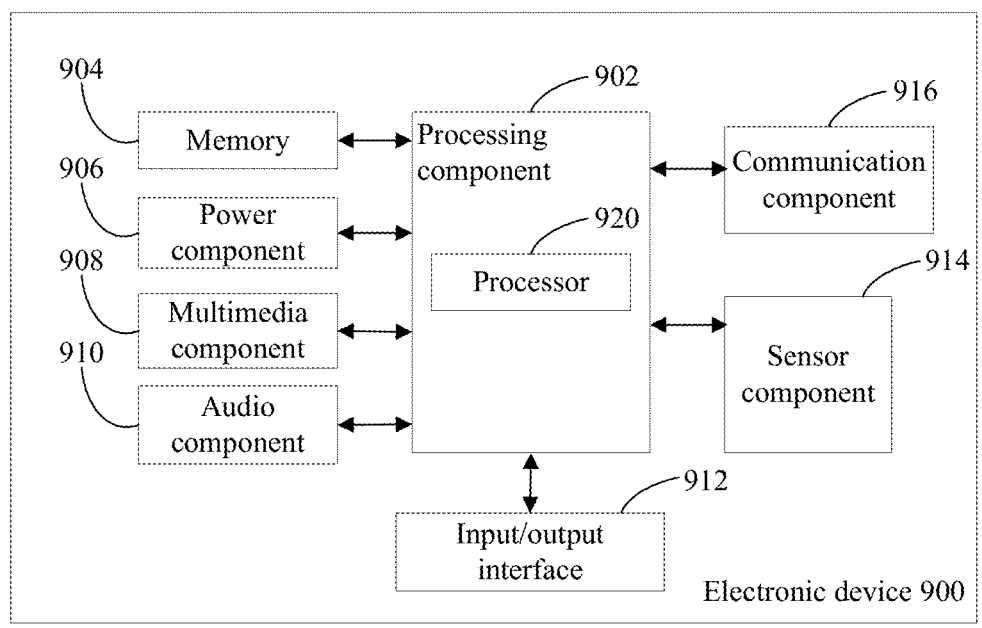
FIG. 9 is a structural block diagram of an electronic device according to Embodiment VI of the present application.

Reference is made to FIG. 9, which shows a structural diagram of an electronic device for performing a vector shift operation according to Embodiment VI of the present application.

As shown in FIG. 9, the electronic device may include one or more of the following components: a processing component 902, a memory 904, a power component 906, a multimedia component 908, an audio component 910, an input/output (I/O) interface 912, a sensor component 914, and a communication component 916.

The processing component 902 generally controls overall operations of the electronic device, such as operations associated with displaying, data communication, a camera operation and a recording operation. The processing component 902 may include one or more processors 920 executing instructions to complete all or part of the steps of the foregoing methods. In addition, the processing component 902 may include one or more modules to facilitate interaction between the processing component 902 and other components. For example, the processing component 902 may include a multimedia module to facilitate interaction between the multimedia component 908 and the processing component 902.

The memory 904 is configured to store various types of data to support operations at the electronic device. Examples of such data include instructions for any application or method operating on the electronic device, contact data, phonebook data, a message, a picture, a video, etc. The memory 904 may be implemented by any type of volatile storage device or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

The power component 906 provides power for various components of the electronic device. The power component 906 may include a power management system, one or more power supplies, and other components associated with power generation, management and distribution for the electronic device 900.

The multimedia component 908 includes a screen providing an output interface between the electronic device and a user. In some embodiments, the screen may include a liquid crystal display (LCD) and a touch panel (TP). If the screen includes the touch panel, the screen can be implemented as a touch screen to receive input signals from the user. The touch panel includes one or more touch sensors to sense a touch, a swipe, and a gesture on the touch panel. The touch sensor can not only sense a boundary of a touch action or a swipe action, but also detect duration and a pressure associated with the touch action or the swipe action. In some embodiments, the multimedia component 908 includes a front camera and/or a rear camera. When the electronic device is in an operating mode, such as a shooting mode or a video mode, the front camera and/or the rear camera can receive external multimedia data. Each of the front camera and the rear camera may be a fixed optical lens system or have focal length and optical zoom capability.

The audio component 910 is configured to output and/or input audio signals. For example, the audio component 910 includes a microphone (MIC), and the microphone is configured to receive external audio signals when the terminal is in an operating mode, such as a call mode, a recording mode and a speech recognition mode. The received audio signals may be further stored in the memory 904 or transmitted via the communication component 916. In some embodiments, the audio component 910 further includes a speaker for outputting audio signals.

The I/O interface 912 provides an interface between the processing component 902 and a peripheral interface module. The peripheral interface module may be a keyboard, a click wheel, a button, or the like. Such button may include, but is not limited to, a home button, a volume button, a start button, and a lock button.

The sensor component 914 includes one or more sensors for providing status assessment in various aspects for the electronic device 900. For example, the sensor component 914 can detect an on/off state of the electronic device 900 and relative positioning of components, for example, the components are a display and a keypad of the terminal; and the sensor component 914 can also detect a position change of the terminal or a position change of a component of the terminal, existence or non-existence of a contact between the user and the electronic device, orientation or acceleration/deceleration of the electronic device, and a temperature change of the electronic device. The sensor component 914 may include a proximity sensor configured to detect the presence of a nearby object in the absence of any physical contact. The sensor component 914 may further include a light sensor, such as a CMOS or charge coupled device (CCD) image sensor, for use in imaging applications. In some embodiments, the sensor component 914 may further include an acceleration sensor, a gyro sensor, a magnetic sensor, a pressure sensor, or a temperature sensor.

The communication component 916 is configured to facilitate wired or wireless communications between the electronic device and other devices. The electronic device can access a wireless network that is based on a communication standard, such as WiFi, 2G or 3G, or a combination thereof. In an exemplary embodiment, the communication component 916 receives a broadcast signal from an external broadcast management system or broadcasts related information, via a broadcast channel. In an exemplary embodiment, the communication component 916 further includes a near field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology and other technologies.

In an exemplary embodiment, the electronic device can be implemented by one or more of an application specific integrated circuit (ASIC), a digital signal processor (DSP), a digital signal processing device (DSPD), a programmable logic device (PLD), a field programmable gate array (FPGA), a controller, a micro-controller, a microprocessor or other electronic elements, for performing the foregoing vector shift method.

The electronic device in the embodiment of the present application is used to implement the corresponding methods for performing vector shift with use of instructions in the foregoing method embodiments, and has beneficial effects of the corresponding method implementations. Details will not be described herein again.

The embodiments in the specification are described in a progressive manner, and each of the embodiments focuses on a difference from other embodiments, thus cross reference can be made to the embodiments for a same part or similar parts. Since the apparatus embodiments are basically similar to the method embodiments, the description thereof is relatively simple. For a relevant part, reference may be made to some descriptions of the method embodiments.

The vector shift method, the processor, the electronic device and the readable storage medium provided in the present application have been described in details hereinbefore. Principles and implementations of the present application are elaborated herein by applying specific examples, and the description of the foregoing embodiments is only used to help understand the method and the core idea of the present application; meanwhile, for those of ordinary skill in the art, there would be a change to the embodiments and the scope of application based on the conception of the present application. In summary, the contents of the specification should not be interpreted as a restriction on the present application.

The algorithms and displays provided herein are not intrinsically associated with any particular computer, electronic system or other device. Various general-purpose systems can also be used together with the teachings herein. Based on the foregoing descriptions, the structure required to construct such system is obvious. In addition, the present application is not directed at any particular programming language. It will be appreciated that the contents of the present application described here can be implemented in various programming languages and that the description of a particular language given hereinbefore is intended to disclose the best implementation of the present application.

In the specification provided here, massive specific details have been explained. It can be understood, however, that the embodiments of the present application can be practiced without these specific details. In some instances, well-known methods, structures and techniques are not shown in detail so as not to obscure the comprehension of the specification.

Similarly, it will be appreciated that, to streamline the disclosure and to aid the understanding of one or more of various inventive aspects, in the foregoing description of the exemplary embodiments of the present application, the features of the present application are sometimes grouped together into a single embodiment, figure or description thereof. However, the disclosed method should not be interpreted as an intention reflection that the present application seeking for protection claims more features than those explicitly stated in each claim. More precisely, the inventive aspects rest with having fewer features than individual embodiments disclosed previously, as reflected in the claims below. Therefore, claims following specific embodiments are thereby explicitly incorporated into the specific embodiments, where each claim itself serves as an individual embodiment of the present application.

Those skilled in the art can understand that modules of the device in the embodiments may be adaptively changed and they may be arranged in one or more devices different from that of the embodiments. Modules or units or components in the embodiments may be combined into a single module or unit or component, and they may also be divided into a plurality of submodules or subunits or subcomponents. Except that at least some of such features and/or processes or units are mutually exclusive, all features disclosed in the specification (including the accompanying claims, abstract and drawings) and all processes or units of any process or device so disclosed may be combined in any combination. Unless otherwise expressly stated, each feature disclosed in the specification (including accompanying claims, abstract and drawings) may be replaced by an alternative feature that provides the same, equivalent or similar purpose.

In addition, those skilled in the art can understand that, although some of the embodiments described herein include some features included in other embodiments rather than else features, a combination of features of different embodiments implies being within the scope of the present application and forming different embodiments. For example, in the following claims, any one of the claimed embodiments can be used in any combination.

Individual component embodiments of the present application may be implemented in hardware, or in a software module running on one or more processors, or in a combination of them. Those skilled in the art should understand that a microprocessor or a digital signal processor (DSP) can be used in practice to implement some or all functions of some or all components of the electronic device according to an embodiment of the present application. The present application may also be implemented as a device or a program apparatus (e.g., a computer program and a computer program product) for performing some or all methods described herein. Such program for implementing the present application may be stored on a computer-readable medium or may be in a form of one or more signals. Such signal may be downloaded from an Internet website, or provided on a carrier signal, or provided in any other form.

It should be noted that the foregoing embodiments are intended to describe the present application rather than limit the present application. Moreover, those skilled in the art may devise an alternative embodiment without departing from the scope of the appended claims. In the claims, any reference symbol located between parentheses should not be constructed as a limitation of the claims. The word "include" does not preclude the presence of an element or a step that is not listed in the claims. The word "a" or "an" before an element does not preclude the existence of multiple such elements. The present application can be implemented with the help of hardware including several different elements and with the help of a properly programmed computer. In a unit claim of several apparatuses enumerated, a number of these apparatuses may be specifically embodied by a same hardware item. The use of the words such as first, second and third does not indicate any order. These words may be interpreted as names.

The invention claimed is:

1. A vector shift method, comprising:
receiving an instruction comprising a register identifier and a shift parameter, wherein the register identifier comprises a source register identifier representing a source register to store a source element to be operated in a vector shift operation, and a destination register identifier representing a destination register to store a target element obtained from the vector shift operation, and the shift parameter is used to indicate a rule for the vector shift operation performed on the source element; wherein the shift parameter comprises a shift amount and an opcode; the shift amount is used to indicate a number of bits by which the source element is to be shifted in the vector shift operation; the opcode is used to represent a shift operation rule for the source element from the source register and the target element from the destination register; wherein the opcode comprises a parameter of a name of the instruction, a parameter for indicating a data type of the source element and a parameter for indicating a data type of the target element;
executing the instruction to determine a shift amount and a shift operation rule according to the shift parameter; wherein the vector shift operation has at least one source element; selecting from the source register, according to the opcode, the source element for performing the vector shift operation, and determining the selected source element as an operand; and performing the corresponding shift operation on the operand according to the opcode, to generate a shift operation result; determining an element in the shift operation result as the target element; determining, according to the opcode, a storage mode of the target element into the destination register; and storing, according to the storage mode, the target element into the destination register;
wherein the shift amount is an immediate; the source register comprises a first source register and a second source register;
the selecting from the source register, according to the opcode, the source element for performing the vector shift operation, and the determining the selected source element as the operand comprises:
performing, according to the opcode, a selecting operation in the first source register and the second source register respectively, to obtain at least two sets of operands;
the performing the corresponding shift operation on the operand according to the opcode, to generate the shift operation result comprises:
splicing the at least two sets of operands according to the opcode, and then generating at least one splicing vector;
performing, according to the immediate, a shift and rounding and saturation to half width operation on each source element in the at least one splicing vector, to generate at least one initial shift operation result; and
performing a bit selecting operation on each of the at least one initial shift operation result, to generate the shift operation result.

2. A processor, comprising:
a plurality of vector registers comprising a source register and a destination register, wherein the source register is configured to store a source element to be operated in a vector shift operation;
an instruction decoding unit configured to decode a vector shift instruction, wherein the vector shift instruction comprises a register identifier and a shift parameter, the register identifier comprises a source register identifier representing the source register and a destination register identifier representing the destination register; wherein the shift parameter comprises a shift amount and an opcode; the shift amount is used to indicate a number of bits by which the source element is to be shifted in the vector shift operation; the opcode is used to represent a shift operation rule for the source element from the source register and the target element from the destination register; wherein the opcode comprises a parameter of a name of the instruction, a parameter for indicating a data type of the source element and a parameter for indicating a data type of the target element; and
a performing unit configured to determine a shift amount and a shift operation rule according to the shift parameter; wherein the vector shift operation has at least one source element; select from the source register, according to the opcode, the source element for performing the vector shift operation, and determine the selected source element as an operand; perform the corresponding shift operation on the operand according to the opcode, to generate a shift operation result; determine the shift operation result as the target element; determine, according to the opcode, a storage mode of the target element into the destination register; and store, according to the storage mode, the target element into the destination register;
wherein the shift amount is an immediate; the source register comprises a first source register and a second source register;
the select from the source register, according to the opcode, the source element for performing the vector shift operation, and the determine the selected source element as the operand comprises:
perform, according to the opcode, a selecting operation in the first source register and the second source register respectively, to obtain at least two sets of operands;
the perform the corresponding shift operation on the operand according to the opcode, to generate the shift operation result comprises:
splice the at least two sets of operands according to the opcode, and then generate at least one splicing vector;
perform, according to the immediate, a shift and rounding and saturation to half width operation on each source element in the at least one splicing vector, to generate at least one initial shift operation result; and
perform a bit selecting operation on each of the at least one initial shift operation result, to generate the shift operation result.

3. A vector shift method, comprising:
receiving an instruction comprising a register identifier and a shift parameter, wherein the register identifier comprises a source register identifier representing a source register to store a source element to be operated in a vector shift operation, and a destination register identifier representing a destination register to store a target element obtained from the vector shift operation, and the shift parameter is used to indicate a rule for the vector shift operation performed on the source element; wherein the shift parameter comprises a shift amount and an opcode; the shift amount is used to indicate a number of bits by which the source element is to be shifted in the vector shift operation; the opcode is used to represent a shift operation rule for the source element from the source register and the target element from the destination register; wherein the opcode comprises a parameter of a name of the instruction, a parameter for indicating a data type of the source element and a parameter for indicating a data type of the target element;

executing the instruction to determine a shift amount and a shift operation rule according to the shift parameter; wherein the vector shift operation has at least one source element; selecting from the source register, according to the opcode, the source element for performing the vector shift operation, and determining the selected source element as an operand; and performing the corresponding shift operation on the operand according to the opcode, to generate a shift operation result; determining an element in the shift operation result as the target element; determining, according to the opcode, a storage mode of the target element into the destination register; and storing, according to the storage mode, the target element into the destination register;

wherein the opcode is a third-type vector opcode; the source register comprises a first source register;

the selecting from the source register, according to the opcode, the source element for performing the vector shift operation, and the determining the selected source element as the operand comprises:

performing a selecting operation in the first source register according to the third-type vector opcode, to obtain a fifth operand; wherein the selecting operation comprises any one of: selecting consecutive lower half data for each element in the first source register, selecting consecutive higher half data for each element in the first source register, selecting consecutive middle bit-designated data for each element in the first source register, and selecting non-consecutive bit-designated data for each element in the first source register;

the performing the corresponding shift operation on the operand according to the opcode, to generate the shift operation result comprises:

performing, according to the third-type vector opcode and the shift amount, a shift and rounding and saturation to half width operation on the fifth operand, to generate a fourth initial shift operation result;

performing a bit selecting operation on the fourth initial shift operation result, to generate the shift operation result; wherein the bit selecting operation comprises any one of: selecting consecutive lower half data for each element contained in the fourth initial shift operation result, selecting consecutive higher half data for each element contained in the fourth initial shift operation result, selecting consecutive middle bit-designated data for each element contained in the fourth initial shift operation result, and selecting non-consecutive bit-designated data for each element contained in the fourth initial shift operation result;

the storing, according to the storage mode, the target element into the destination register comprises:

writing the data in the shift operation result sequentially into a corresponding location of the destination register; and setting, according to the third-type vector opcode, a value for a location into which the data is not written in the destination register.

4. The method according to claim 1, wherein the opcode is a first-type vector opcode;

the selecting from the source register, according to the opcode, the source element for performing the vector shift operation, and the determining the selected source element as the operand further comprises:

determining, according to the first-type vector opcode, all source elements from the first source register as an operand and all source elements from the second source register as an operand;

the performing the corresponding shift operation on the operand according to the opcode, to generate the shift operation result further comprises:

splicing the operand from the first source register and the operand from the second source register according to the first-type vector opcode, and then generating a first splicing vector;

performing, according to the immediate, the shift and rounding and saturation to half width operation on each source element in the first splicing vector, to generate a first initial shift operation result; and performing the bit selecting operation on the first initial shift operation result, to generate the shift operation result, wherein the bit selecting operation comprises any one of: selecting consecutive lower half data for each element contained in the first initial shift operation result, selecting consecutive higher half data for each element contained in the first initial shift operation result, selecting consecutive middle bit-designated data for each element contained in the first initial shift operation result, and selecting non-consecutive bit-designated data for each element contained in the first initial shift operation result.

5. The method according to claim 4, wherein the first-type vector opcode is a first vector opcode;

the performing, according to the immediate, the shift and rounding and saturation to half width operation on each source element in the first splicing vector, to generate the first initial shift operation result comprises:

performing, according to the immediate, a logical right shift and rounding and signed saturation to half width operation on each source element in the first splicing vector, to generate the first initial shift operation result;

the performing the bit selecting operation on the first initial shift operation result, to generate the shift operation result comprises:

selecting, for each individual element contained in the first initial shift operation result, the consecutive lower half data thereof, and determining the element after the selecting operation as the shift operation result.

6. The method according to claim 4, wherein the first-type vector opcode is a second vector opcode;

the performing, according to the immediate, the shift and rounding and saturation to half width operation on each source element in the first splicing vector, to generate the first initial shift operation result comprises:

performing, according to the immediate, an arithmetic right shift and rounding and signed saturation to half width operation on each source element in the first splicing vector, to generate the first initial shift operation result;

the performing the bit selecting operation on the first initial shift operation result, to generate the shift operation result comprises:

selecting, for each individual element contained in the first initial shift operation result, the consecutive lower half data thereof, and determining the element after the selecting operation as the shift operation result.

7. The method according to claim 4, wherein the first-type vector opcode is a third vector opcode;

the performing, according to the immediate, the shift and rounding and saturation to half width operation on each source element in the first splicing vector, to generate the first initial shift operation result comprises:

performing, according to the immediate, a logical right shift and rounding and unsigned saturation to half width operation on each source element in the first splicing vector, to generate the first initial shift operation result;

the performing the bit selecting operation on the first initial shift operation result, to generate the shift operation result comprises:

selecting, for each individual element contained in the first initial shift operation result, the consecutive lower half data thereof, and determining the element after the selecting operation as the shift operation result.

8. The method according to claim 4, wherein the first-type vector opcode is a fourth vector opcode;

the performing, according to the immediate, the shift and rounding and saturation to half width operation on each source element in the first splicing vector, to generate the first initial shift operation result comprises:

performing, according to the immediate, an arithmetic right shift and rounding and unsigned saturation to half width operation on each source element in the first splicing vector, to generate the first initial shift operation result;

the performing the bit selecting operation on the first initial shift operation result, to generate the shift operation result comprises:

selecting, for each individual element contained in the first initial shift operation result, the consecutive lower half data thereof, and determining the element after the selecting operation as the shift operation result.

9. The method according to claim 1, wherein the opcode is a second-type vector opcode;

the selecting from the source register, according to the opcode, the source element for performing the vector shift operation, and the determining the selected source element as the operand further comprises:

performing, according to the second-type vector opcode, the selecting operation in the first source register and the second source register respectively, to obtain a first operand and a second operand; wherein the selecting operation comprises any one of: selecting consecutive lower half data for each element in the first source register and the second source register, selecting consecutive higher half data for each element in the first source register and the second source register, selecting consecutive middle bit-designated data for each element in the first source register and the second source register, and selecting non-consecutive bit-designated data for each element in the first source register and the second source register; and determining data in the first source register other than the first operand as a third operand, and determining data in the second source register other than the second operand as a fourth operand;

the performing the corresponding shift operation on the operand according to the opcode, to generate the shift operation result further comprises:

splicing the first operand and the second operand, and then generating a second splicing vector; and splicing the third operand and the fourth operand, and then generating a third splicing vector; wherein a source element contained in each of the second splicing vector and the third splicing vector has any one of the following data types: half-word, word, double-word and quad-word;

performing, according to the immediate, the shift and rounding and saturation to half width operation on each source element in the second splicing vector, to generate a second initial shift operation result; and performing, according to the immediate, the shift and rounding and saturation to half width operation on each source element in the third splicing vector, to generate a third initial shift operation result; and performing the bit selecting operation on the second initial shift operation result, to generate a first shift operation result, and performing the bit selecting operation on the third initial shift operation result, to generate a second shift operation result; wherein the performing the bit selecting operation comprises any one of: selecting consecutive lower half data for each element contained in the second initial shift operation result and each element contained in the third initial shift operation result, selecting consecutive higher half data for each element contained in the second initial shift operation result and each element contained in the third initial shift operation result, selecting consecutive middle bit-designated data for each element contained in the second initial shift operation result and each element contained in the third initial shift operation result, and selecting non-consecutive bit-designated data for each element contained in the second initial shift operation result and each element contained in the third initial shift operation result;

the storing, according to the storage mode, the target element into the destination register comprises:

writing the first shift operation result into a corresponding storage location of the destination register according to a bit selecting operation location of the first shift operation result; and writing the second shift operation result into a corresponding storage location of the destination register according to a bit selecting operation location of the second shift operation result.

10. The method according to claim 9, wherein the second-type vector opcode is a fifth vector opcode; the first operand is data composed of a consecutive lower half of each element from the first source register; the second operand is data composed of a consecutive lower half of each element from the second source register; the third operand is data composed of a consecutive higher half of each element from the first source register; and the fourth operand is data composed of a consecutive higher half of each element from the second source register;

the performing, according to the immediate, the shift and rounding and saturation to half width operation on each source element in the second splicing vector, to generate the second initial shift operation result; and the performing, according to the immediate, the shift and rounding and saturation to half width operation on each source element in the third splicing vector, to generate the third initial shift operation result comprise:

performing, according to the immediate, a logical right shift and rounding and signed saturation to half width operation on each source element in the second splicing vector, to generate the second initial shift operation result; and performing, according to the immediate, a logical right shift and rounding and signed saturation to half width operation on each source element in the third splicing vector, to generate the third initial shift operation result;

the performing the bit selecting operation on the second initial shift operation result, to generate the first shift operation result, and the performing the bit selecting operation on the third initial shift operation result, to generate the second shift operation result comprise:

selecting, for each individual element contained in the second initial shift operation result, the consecutive lower half data thereof, and determining the selected data as the first shift operation result; and selecting, for each individual element contained in the third initial shift operation result, the consecutive higher half data thereof, and determining the selected data as the second shift operation result; wherein at least one first target element is determined according to the data contained in the first shift operation result, and at least one second target element is determined according to the data contained in the second shift operation result;

the writing the first shift operation result into the corresponding storage location of the destination register according to the bit selecting operation location of the first shift operation result comprises:

writing each first target element contained in the first shift operation result into a lower half of a position of the each first target element in the destination register;

the writing the second shift operation result into the corresponding storage location of the destination register according to the bit selecting operation location of the second shift operation result comprises:

writing each second target element contained in the second shift operation result into a higher half of a position of the each second target element in the destination register.

11. The method according to claim 9, wherein the second-type vector opcode is a sixth vector opcode; the first operand is data composed of a consecutive lower half of each element from the first source register; the second operand is data composed of a consecutive lower half of each element from the second source register; the third operand is data composed of a consecutive higher half of each element from the first source register; and the fourth operand is data composed of a consecutive higher half of each element from the second source register;

the performing, according to the immediate, the shift and rounding and saturation to half width operation on each source element in the second splicing vector, to generate the second initial shift operation result; and the performing, according to the immediate, the shift and rounding and saturation to half width operation on each source element in the third splicing vector, to generate the third initial shift operation result comprise:

performing, according to the immediate, an arithmetic right shift and rounding and signed saturation to half width operation on each source element in the second splicing vector, to generate the second initial shift operation result; and performing, according to the immediate, an arithmetic right shift and rounding and signed saturation to half width operation on each source element in the third splicing vector, to generate the third initial shift operation result;

the performing the bit selecting operation on the second initial shift operation result, to generate the first shift operation result, and the performing the bit selecting operation on the third initial shift operation result, to generate the second shift operation result comprise:

selecting, for each individual element contained in the second initial shift operation result, the consecutive lower half data thereof, and determining the selected data as the first shift operation result; and selecting, for each individual element contained in the third initial shift operation result, the consecutive higher half data thereof, and determining the selected data as the second shift operation result; wherein at least one first target element is determined according to the data contained in the first shift operation result, and at least one second target element is determined according to the data contained in the second shift operation result;

the writing the first shift operation result into the corresponding storage location of the destination register according to the bit selecting operation location of the first shift operation result comprises:

writing each first target element contained in the first shift operation result into a lower half of a position of the each first target element in the destination register;

the writing the second shift operation result into the corresponding storage location of the destination register according to the bit selecting operation location of the second shift operation result comprises:

writing each second target element contained in the second shift operation result into a higher half of a position of the each second target element in the destination register.

12. The method according to claim 9, wherein the second-type vector opcode is a seventh vector opcode; the first operand is data composed of a consecutive lower half of each element from the first source register; the second operand is data composed of a consecutive lower half of each element from the second source register; the third operand is data composed of a consecutive higher half of each element from the first source register; and the fourth operand is data composed of a consecutive higher half of each element from the second source register;

the performing, according to the immediate, the shift and rounding and saturation to half width operation on each source element in the second splicing vector, to generate the second initial shift operation result; and the performing, according to the immediate, the shift and rounding and saturation to half width operation on each source element in the third splicing vector, to generate the third initial shift operation result comprise:

performing, according to the immediate, a logical right shift and rounding and unsigned saturation to half width operation on each source element in the second splicing vector, to generate the second initial shift operation result; and performing, according to the immediate, a logical right shift and rounding and unsigned saturation to half width operation on each source element in the third splicing vector, to generate the third initial shift operation result;

the performing the bit selecting operation on the second initial shift operation result, to generate the first shift operation result, and the performing the bit selecting operation on the third initial shift operation result, to generate the second shift operation result comprise:

selecting, for each individual element contained in the second initial shift operation result, the consecutive lower half data thereof, and determining the selected data as the first shift operation result; and selecting, for each individual element contained in the third initial shift operation result, the consecutive higher half data thereof, and determining the selected data as the second shift operation result; wherein at least one first target element is determined according to the data contained in the first shift operation result, and at least one second target element is determined according to the data contained in the second shift operation result;

the writing the first shift operation result into the corresponding storage location of the destination register according to the bit selecting operation location of the first shift operation result comprises:

writing each first target element contained in the first shift operation result into a lower half of a position of the each first target element in the destination register;

the writing the second shift operation result into the corresponding storage location of the destination register according to the bit selecting operation location of the second shift operation result comprises:

writing each second target element contained in the second shift operation result into a higher half of a position of the each second target element in the destination register.

13. The method according to claim 9, wherein the second-type vector opcode is an eighth vector opcode; the first operand is data composed of a consecutive lower half of each element from the first source register; the second operand is data composed of a consecutive lower half of each element from the second source register; the third operand is data composed of a consecutive higher half of each element from the first source register; and the fourth operand is data composed of a consecutive higher half of each element from the second source register;

the performing, according to the immediate, the shift and rounding and saturation to half width operation on each source element in the second splicing vector, to generate the second initial shift operation result; and the performing, according to the immediate, the shift and rounding and saturation to half width operation on each source element in the third splicing vector, to generate the third initial shift operation result comprise:

performing, according to the immediate, an arithmetic right shift and rounding and unsigned saturation to half width operation on each source element in the second splicing vector, to generate the second initial shift operation result; and performing, according to the immediate, an arithmetic right shift and rounding and unsigned saturation to half width operation on each source element in the third splicing vector, to generate the third initial shift operation result;

the performing the bit selecting operation on the second initial shift operation result, to generate the first shift operation result, and the performing the bit selecting operation on the third initial shift operation result, to generate the second shift operation result comprise:

selecting, for each individual element contained in the second initial shift operation result, the consecutive lower half data thereof, and determining the selected data as the first shift operation result; and selecting, for each individual element contained in the third initial shift operation result, the consecutive higher half data thereof, and determining the selected data as the second shift operation result; wherein at least one first target element is determined according to the data contained in the first shift operation result, and at least one second target element is determined according to the data contained in the second shift operation result;

the writing the first shift operation result into the corresponding storage location of the destination register according to the bit selecting operation location of the first shift operation result comprises:

writing each first target element contained in the first shift operation result into a lower half of a position of the each first target element in the destination register;

the writing the second shift operation result into the corresponding storage location of the destination register according to the bit selecting operation location of the second shift operation result comprises:

writing each second target element contained in the second shift operation result into a higher half of a position of the each second target element in the destination register.

14. The method according to claim 3, wherein the third-type vector opcode is a ninth vector opcode, and the fifth operand is any consecutive source element from the first source register;

the performing, according to the third-type vector opcode and the shift amount, the shift and rounding and saturation to half width operation on the fifth operand, to generate the fourth initial shift operation result comprises:

performing, according to the shift amount, a logical right shift and rounding and signed saturation to half width operation on each source element contained in the fifth operand, to generate the fourth initial shift operation result;

the performing the bit selecting operation on the fourth initial shift operation result, to generate the shift operation result comprises:

selecting, for each individual element contained in the fourth initial shift operation result, the consecutive lower half data thereof, and determining the element after the selecting operation as the shift operation result;

the writing the data in the shift operation result sequentially into the corresponding location of the destination register and the setting, according to the third-type vector opcode, the value for the location into which the data is not written in the destination register comprise:

partitioning a storage location of the destination register according to a preset value, and determining a storage area of each target element;

writing the data in the shift operation result sequentially into a lower half of each storage area; and setting a value for a location into which the data is not written in each storage area to be zero.

15. The method according to claim 3, wherein the third-type vector opcode is a tenth vector opcode, and the fifth operand is any consecutive source element from the first source register;

the performing, according to the third-type vector opcode and the shift amount, the shift and rounding and saturation to half width operation on the fifth operand, to generate the fourth initial shift operation result comprises:

performing, according to the shift amount, an arithmetic right shift and rounding and signed saturation to half width operation on each source element contained in the fifth operand, to generate the fourth initial shift operation result;

the performing the bit selecting operation on the fourth initial shift operation result, to generate the shift operation result comprises:

separately selecting, for each individual element contained in the fourth initial shift operation result, the consecutive lower half data thereof, and determining the element after the selecting operation as the shift operation result;

the writing the data in the shift operation result sequentially into the corresponding location of the destination register and the setting, according to the third-type vector opcode, the value for the location into which the data is not written in the destination register comprise:

partitioning a storage location of the destination register according to a preset value, and determining a storage area of each target element;

writing the data in the shift operation result sequentially into a lower half of each storage area; and setting a value for a location into which the data is not written in each storage area to be zero.

16. The method according to claim 3, wherein the third-type vector opcode is an eleventh vector opcode, and the fifth operand is any consecutive source element from the first source register;

the performing, according to the third-type vector opcode and the shift amount, the shift and rounding and saturation to half width operation on the fifth operand, to generate the fourth initial shift operation result comprises:

performing, according to the shift amount, a logical right shift and rounding and unsigned saturation to half width operation on each source element contained in the fifth operand, to generate the fourth initial shift operation result;

the performing the bit selecting operation on the fourth initial shift operation result, to generate the shift operation result comprises:

selecting, for each individual element contained in the fourth initial shift operation result, the consecutive lower half data thereof, and determining the element after the selecting operation as the shift operation result;

the writing the data in the shift operation result sequentially into the corresponding location of the destination register and the setting, according to the third-type vector opcode, the value for the location into which the data is not written in the destination register comprise:

partitioning a storage location of the destination register according to a preset value, and determining a storage area of each target element;

writing the data in the shift operation result sequentially into a lower half of each storage area; and setting a value for a location into which the data is not written in each storage area to be zero.

17. The method according to claim 3, wherein the third-type vector opcode is a twelfth vector opcode, and the fifth operand is any consecutive source element from the first source register;

the performing, according to the third-type vector opcode and the shift amount, the shift and rounding and saturation to half width operation on the fifth operand, to generate the fourth initial shift operation result comprises:

performing, according to the shift amount, an arithmetic right shift and rounding and unsigned saturation to half width operation on each source element contained in the fifth operand, to generate the fourth initial shift operation result;

the performing the bit selecting operation on the fourth initial shift operation result, to generate the shift operation result comprises:

separately selecting, for each individual element contained in the fourth initial shift operation result, the consecutive lower half data thereof, and determining the element after the selecting operation as the shift operation result;

the writing the data in the shift operation result sequentially into the corresponding location of the destination register and the setting, according to the third-type vector opcode, the value for the location into which the data is not written in the destination register comprise:

partitioning a storage location of the destination register according to a preset value, and determining a storage area of each target element;

writing the data in the shift operation result sequentially into a lower half of each storage area; and setting a value for a location into which the data is not written in each storage area to be zero.

* * * * *